(12) United States Patent
Jørgensen et al.

(10) Patent No.: US 12,247,543 B2
(45) Date of Patent: Mar. 11, 2025

(54) DAMAGE TOLERANT COVER SHEET FOR PREMANUFACTURED SPAR CAP

(71) Applicant: LM WIND POWER A/S, Kolding (DK)

(72) Inventors: Jeppe Bjørn Jørgensen, Kolding (DK); Ole Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/689,193

(22) PCT Filed: Dec. 6, 2022

(86) PCT No.: PCT/EP2022/084573
§ 371 (c)(1),
(2) Date: Mar. 5, 2024

(87) PCT Pub. No.: WO2023/104782
PCT Pub. Date: Jun. 15, 2023

(65) Prior Publication Data
US 2024/0271596 A1   Aug. 15, 2024

(30) Foreign Application Priority Data

Dec. 7, 2021   (EP) ..................................... 21212986

(51) Int. Cl.
F03D 1/06   (2006.01)
(52) U.S. Cl.
CPC ........ F03D 1/0681 (2023.08); *F05B 2230/23* (2013.01); *F05B 2280/6003* (2013.01)
(58) Field of Classification Search
CPC .......... F05B 2230/23; F05B 2280/6003; F05B 2240/30; F03D 1/06; F03D 1/0675; F03D 1/0681; B29D 99/0028; B29L 2031/082
See application file for complete search history.

(56) References Cited

U.S. PATENT DOCUMENTS

| 2014/0145367 A1* | 5/2014 | Li ............................. C08J 5/06 |
| | | 264/172.14 |
| 2015/0151390 A1* | 6/2015 | Upton ..................... F03D 80/00 |
| | | 29/889.7 |

(Continued)

FOREIGN PATENT DOCUMENTS

| CN | 113123925 A | 7/2021 |
| WO | 2021219755 A1 | 11/2021 |

*Primary Examiner* — David E Sosnowski
*Assistant Examiner* — Joshua R Beebe
(74) *Attorney, Agent, or Firm* — Nath, Goldberg & Meyer; Tanya E. Harkins

(57) ABSTRACT

The present invention relates to a pre-manufactured spar cap for a wind turbine blade comprising a spar cap structure comprising a plurality of fibre-reinforced composite elements arranged in stacked rows and separated by interlayers and a first and/or second damage tolerant cover sheet. The first and/or second damage tolerant cover sheets each comprises a first damage tolerant fibre layer and a second damage tolerant fibre layer attached to each other in attachment areas, wherein the attachments areas are separated from each other by a distance between 1-5 cm. Furthermore, the spar cap structure and the first and/or second damager tolerant cover sheet are embedded in a first cured resin. The present invention also relates to a damage tolerant cover sheet as such, as well as a wind turbine comprising a first and/or second damage tolerant cover sheet. Also, the present invention relates to methods of manufacturing a premanufactured spar cap, a wind turbine shell member and a wind turbine blade comprising the first and/or second damage tolerant cover sheet.

15 Claims, 9 Drawing Sheets

(56) References Cited

U.S. PATENT DOCUMENTS

Figure 1:
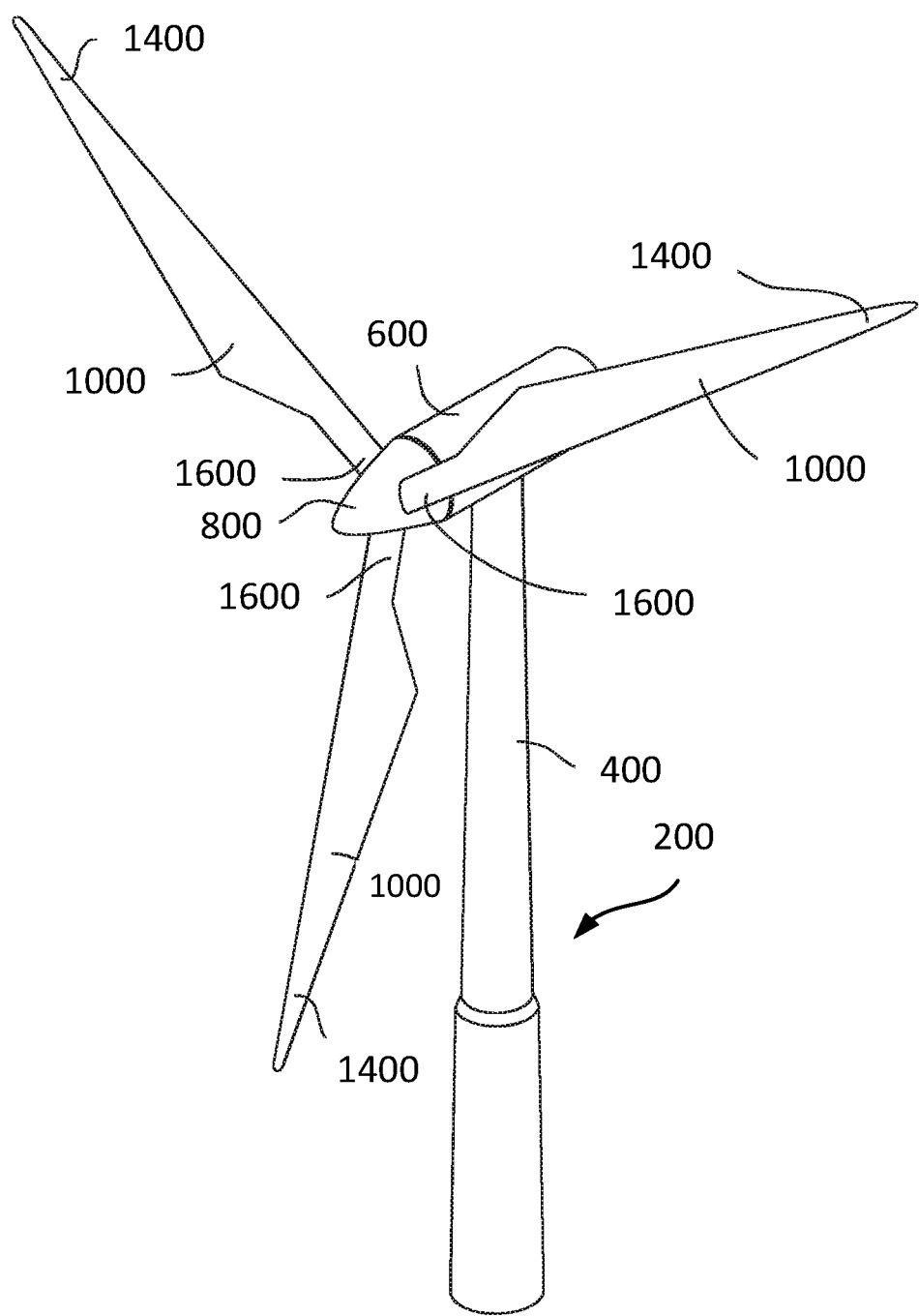

2018/0223799 A1* 8/2018 Kimura .................. B32B 27/36
2020/0291557 A1* 9/2020 Möcke .................. D04H 3/004

* cited by examiner

DAMAGE TOLERANT COVER SHEET FOR PREMANUFACTURED SPAR CAP

This is a National Phase Application filed under 35 U.S.C. 371 as a national stage of PCT/EP2022/084573, filed Dec. 6, 2022, an application claiming the benefit of European Application No. 21212986.0, filed Dec. 7, 2021, the content of each of which is hereby incorporated by reference in its entirety.

FIELD OF INVENTION

The present invention relates to a damage tolerant cover sheet, a pre-manufactured spar cap comprising the damage tolerant cover sheet and a wind turbine blade comprising the pre-manufactured cover sheet. The present invention further relates to a method of manufacturing a pre-manufactured spar cap, a blade shell member and a wind turbine blade comprising the damage tolerant cover sheet.

BACKGROUND OF THE INVENTION

The blades of modern wind turbines capture kinetic wind energy by using sophisticated blade design created to maximise efficiency. The blades are typically made from a fibre-reinforced polymer material and comprise a pressure side shell half and a suction side shell half. The cross-sectional profile of a typical blade includes an airfoil for creating an air flow leading to a pressure difference between the two sides. The resulting lift force generates torque for producing electricity.

The shell halves of wind turbine blades are usually manufactured using blade moulds. First, a blade gel coat or primer is applied to the mould. Subsequently, fibre reinforcement material is placed into the mould in layers followed by arrangement of other elements within the shell halves, such as core elements, load-carrying spar caps, internal shear webs and the like. The resulting shell halves are resin infused and assembled by being glued or bolted together substantially along a chord plane of the blade.

The spar caps comprise a plurality of carbon pultrusion elements and interlayers arranged between the carbon pultrusion elements. The spar caps may be produced directly in the wind turbine blade moulds or in a separate offline mould where they are resin infused and then subsequently lifted into the main blade shell mould which is then infused with resin.

Different combinations of resins may be used for the spar cap and the main blade shell. It is very important to ensure a sufficiently strong adhesion between the shell and the pre-manufactured spar cap since bonding of resin onto the spar cap is crucial for the structural integrity of the blade. Vinyl ester or epoxy ester resins have good adherence properties and are often used, whereas other resins, such as polyester resin, have an attractive price. However, the adhesion properties of polyester resin are low compared to vinyl ester and epoxy resin.

To decrease the overall price, spar caps may be made offline and infused with vinyl ester resin. The pre-manufactured spar cap may then be placed in a blade shell together with the remaining blade shell parts and infused with polyester resin.

However, because the fracture toughness of the polyester laminate is lower than the fracture toughness of the vinyl ester laminate, any cracks starting at the interface between the spar cap and the remaining blade shell parts will propagate in the interface or kink into the polyester laminate.

Hence, improved methods to ensure a sufficiently strong adhesion between the shell member parts and the pre-manufactured spar cap would be advantageous. Particularly a method of avoiding cracks from propagating into the polyester laminate.

SUMMARY OF DISCLOSURE

It is an object of the present disclosure to provide a wind turbine blade, wherein cracks starting at the interface between the spar cap and the remaining blade shell parts will not propagate in the interface or kink into the blade shell member, particularly when the spar cap is resin infused with vinyl ester or epoxy resin and the blade mould is resin infused with polyester.

The present inventors have found that one or more of said objects may be achieved by arranging a damage tolerant cover sheet according to a first aspect of the present invention at the interface between a pre-manufactured spar cap and the remaining parts of the blade shell member.

By having a damage tolerant cover sheet at the interface between the premanufactured spar cap with a low cohesive strength and low fracture toughness compared to the polyester laminate, any cracks starting at the interface between the spar cap and the remaining blade shell parts will propagate into the damage tolerant cover sheet with low cohesive strength but high fracture toughness.

Thus, in a first aspect the present invention relates to a damage tolerant cover sheet comprising
 a first damage tolerant fibre layer forming part of a first outer surface of the damage tolerant cover sheet; and
 a second damage tolerant fibre layer forming part of a second outer surface of the damage tolerant cover sheet, the second outer surface of the damage tolerant cover sheet being opposite to the first outer surface of the damage tolerant cover sheet,
wherein the first damage tolerant fibre layer and the second damage tolerant fibre layer are attached to each other in attachment areas by a first plurality of stitching rows and/or by a first binding agent arranged between the first and second damage tolerant fibre layer in the attachment areas, and wherein the attachments areas are separated from each other by a distance between 1-5 cm, preferably around 2.5 cm.

The damage tolerant cover sheet comprises a first damage tolerant fibre layer and a second damage tolerant fibre layer. The first damage tolerant fibre layer forms part of a first outer surface of the damage tolerant cover sheet and a second damage tolerant fibre layer forms part of a second outer surface of the damage tolerant cover sheet. The first outer surfaces of the damage tolerant cover sheet is opposite to the second outer surface of the damage tolerant cover sheet and the first and second outer surface of the damage tolerant cover sheet are the two largest surfaces of the damage tolerant cover sheet.

The first damage tolerant fibre layer preferably comprises a first plurality of fibres being unidirectionally arranged along a first fibre direction and the arrangement of the first plurality of fibres are maintained relative to each other by a second plurality of stitching rows and/or by a second binding agent. The distance between the second plurality of stitching rows in the first damage tolerant fibre layer is not important. Furthermore, the second binding agent need not be arranged in specific areas. The importance of the second plurality of stitching rows and second binding agent is just to maintain the fibres in the first damage tolerant fibre layer relative to each other. In preferred embodiments, the first damage tolerant fibre layer is a unidirectional glass fibre layer or a biaxial glass fibre layer.

The second damage tolerant fibre layer preferably comprises a second plurality of fibres being randomly arranged within the second damage tolerant fibre layer. The arrangement of the second plurality of fibres are maintained relative to each other by a third binding agent. Again, the importance of the third binding agent is just to maintain the fibres in the second damage tolerant fibre layer relative to each other. In preferred embodiments, the second fibre layer is a chopped strand mat (CSM) or a continuous filament mat (CFM) comprising or essentially consisting of glass fibres.

The first damage tolerant fibre layer provides strength to the damage tolerant cover sheet and allows it to be handled easily, while the second damage tolerant fibre layer should be a good "filler materials" which can swell up.

In some embodiments, the first and second damage tolerant fibre layers are attached to each other by a first plurality of stitching rows in the attachment areas.

In some embodiments, the first and second damage tolerant fibre layers are attached to each other by a first binding agent arranged between the first and second damage tolerant fibre layer in the attachment areas.

Importantly, the attachments areas are separated from each other by a distance between 1-5 cm, preferably around 2.5 cm. In this way, the fibres in the damage tolerant cover sheet can be pulled out over a long distance and the fibres being teared out can create a large bridging zone. When the damage tolerant cover sheet is used at the interface between a premanufactured spar cap and the remaining shell components, the distance between the attachment areas can be designed to twerk the interfacial strength to be just less than the interfacial strength between the pre-manufactured spar cap and the remaining shell components, meaning that cracks will tend to go into the damage tolerant cover sheet instead of into the shell components. The distance between the attachment areas may also be larger than 5 cm. Thus, in some embodiments the attachments areas are separated from each other by a distance between 1-20 cm, such as between 1-10 cm, such as between 2-20 cm, such as between 2-10 cm.

Preferably, the first plurality of attachment areas are parallel to each other and arranged along a first attachment direction.

In embodiments where the first and second damage tolerant fibre layers are attached to each other by a first plurality of stitching rows, each attachment area is defined by a thread making up a stitching row. In such embodiments, the distance between the attachment areas should be measured from the stitching thread in one stitching row to an adjacent stitching thread in another stitching row. The distance should be measured such that it is taken perpendicular on the first attachment direction of the two adjacent stitching rows.

In embodiments where the first and second damage tolerant fibre layers are attached to each other by a first plurality of stitching rows, each attachment area is defined by the area covered by binding agent. In embodiments where the first and second damage tolerant fibre layers are attached to each other by a first binding agent, the attachment areas are larger than when the first and second damage tolerant fibre layers are attached to each other by a plurality of stitching rows. This is because a line of binding agent with the same width as a stitching thread, would not be sufficient to bind the two layers together. Thus, in such embodiments, the attachment areas have a width larger than a stitching thread, such as at least 10 times the width of a stitching thread. In such embodiments, the distance between two adjacent attachment areas should be measured from an outer edge (such as a left edge) of one attachment area to an opposite outer edge (such as a right edge) of an adjacent attachment area. The distance should be measured such that it is taken perpendicular on the first attachment direction of the two adjacent attachment areas.

Preferably, a fibre angle between the first attachment direction of the first damage tolerant fibre sheet 10 and the first fibre direction of the plurality of first fibres in the first damage tolerant fibre layer 11 is between 40 degrees and 150 degrees, most preferably 90 degrees.

In some embodiments, the area weight of the damage tolerant cover sheet is between 400 gsm and 1000 gsm, preferably 700 gsm.

Preferably, the damage tolerant cover sheet is configured to have at least the same length as a pre-manufactured spar cap and substantially the same width.

The damage tolerant cover sheet has a length a width and a thickness. Preferably, the damage tolerant cover sheet is designed to have approximately the same length and width as the two largest surfaces of a premanufactured spar cap. The thickness is determined by the thickness of the first and second damage tolerant cover layers when they are arranged on top of each other. In some embodiments, the damage tolerant cover sheet is longer than a pre-manufactured spar cap. In such embodiments, the damage tolerant cover sheet may be provided in a rolled-up configuration allowing it to be stored without taking up too much place and rolled out over the entire length of the spar cap and cut at a desired length.

The damage tolerant cover sheet according to the present invention is configured to be used in a wind turbine blade. Particularly, the damage tolerant cover sheet of the invention is configured to be arranged at the interface between a pre-manufactured spar cap infused with a first resin, such as vinyl ester resin, and the remaining shell components of a wind turbine blade infused with a second resin, such as polyester resin. The damage tolerant cover sheet should preferably cover at least the two largest surfaces of the pre-manufactured spar cap, including any tapering ends of the pre-manufactured spar cap. By having a damage tolerant cover sheet at the interface between the premanufactured spar cap with a low cohesive strength and fracture toughness compared to the remaining shell components, any cracks starting at the interface between the premanufactured spar cap and the remaining shell components will propagate into the damage tolerant cover sheet with low cohesive strength but high fracture toughness.

In a second aspect, the present invention relates to a pre-manufactured spar cap for a wind turbine blade comprising spar cap structure as well as a first and/or a second damage tolerant cover sheet in accordance with the first aspect of the invention.

The spar cap structure comprises a plurality of fibre-reinforced composite elements arranged in stacked rows and separated by interlayers.

The spar cap structure has a length, a width and a height, wherein the length is longer than the width and the width is longer than the height.

Thus, the spar cap structure is preferably an elongated element having a first surface and a second surface defined by the width and length of the spar cap structure. Furthermore, the spar cap structure has two side surfaces, each defined by the length and the height of the spar cap structure, as well as two end surfaces defined by the width and height of the spar cap structure. The first and second surfaces are the two largest surfaces of the spar cap structure and are arranged opposite each other and may have substantially the same sizes. In the same way, the two side surfaces are arranged opposite each other and have substantially the same sizes, and the two end surfaces are arranged opposite each other and have substantially the same sizes. However, since the shape of the spar cap structure is set according to strength requirements, the thickness may change along the longitudinal direction of the spar cap, resulting in tapering sections at the sides and/or the ends.

In some embodiments, the fibre-reinforced composite elements are elongated planks with a rectangular cross-section and made from carbon fibres or glass fibres and cured resin. Alternatively, the fibre-reinforced composite elements may be hybrid pultrusion elements comprising two types of reinforcement fibres, such as glass fibres and carbon fibres.

In some embodiments, the stacked rows of fibre-reinforced composite elements include a first plurality of fibre-reinforced composite elements arranged adjacent to each other in a first row and a second plurality of fibre-reinforced composite elements arranged adjacent to each other in a second row on top of the first row, wherein the first and second row of fibre-reinforced elements are separated by a first interlayer.

Preferably, the spar cap structure comprises more than two rows of fibre-reinforced elements, such as between 3-50, such as between 5-20, such as between 5-10. Each row may comprise between 2-50 fibre-reinforced composite elements, preferable between 5-20, such as 5-10.

The interlayers may be any material promoting resin flow between the fibre-reinforced composite elements and may comprise one or more fibre layers, each comprising glass fibres and/or carbon fibre and/or monofilaments etc. Thus, the interlayers comprise fibre material, such as glass fibres, carbon fibres or polymeric fibres etc. for promoting resin flow between the pultruded carbon planks.

A premanufactured spar cap according to the second aspect of the present invention comprises
- a spar cap structure comprising a plurality of fibre-reinforced composite elements arranged in stacked rows and separated by interlayers,
- a first damage tolerant cover sheet according to the first aspect of the present invention, the first damage tolerant cover sheet is arranged such that the second outer surface of the first damage tolerant cover sheet is in contact with a first surface of the spar cap structure, and the spar cap structure and the first damager tolerant cover sheet are embedded in a first cured resin, such as vinyl ester resin, epoxy ester resin or polyurethane resin.

In some embodiments, the pre-manufactured spar cap further comprises a second damage tolerant cover sheet according to the first aspect of the present invention,
- wherein the second damage tolerant cover sheet is arranged such that the second outer surface of the second damage tolerant cover sheet is in contact with the second surface of the spar cap structure and;
- wherein the spar cap structure, the first damager tolerant cover sheet and the second damage tolerant cover sheet are embedded in the first cured resin.

It should be understood that all embodiments described for the damage tolerant cover sheet in accordance with the first aspect of the invention may all be applied to the pre-manufactured spar cap comprising one or more of such damage tolerant cover sheets according to the second aspect of the present invention.

A pre-manufactured spar cap according to the present invention may be provided as follows:

First, a spar cap mould comprising a spar cap moulding surface is provided and a first damage tolerant cover sheet is arranged on the spar cap moulding surface such that the first outer surface of the first damage tolerant cover sheet is in contact with the spar cap moulding surface. Then, a spar cap structure comprising a plurality of fibre-reinforced composite elements in stacked rows, separated by interlayers, is arranged on the first damage tolerant cover sheet, such that the second outer surface of the first damage tolerant cover sheet is in contact with the first surface of the spar cap structure.

More specifically, arranging the spar cap structure may include arranging a first plurality of fibre-reinforced composite elements adjacent to each other in a first row and arranging a second plurality of fibre-reinforced composite elements adjacent to each other in a second row on top of the first row. A first interlayer is arranged between the first and second row of fibre-reinforced elements. Then, a third plurality of fibre-reinforced composite elements are arranged adjacent to each other in a third row on top of the second row. A second interlayer is arranged between the second and third row of fibre-reinforced elements. In the same way, a fourth, fifth and sixth etc. plurality of fibre-reinforced composite elements are arranged adjacent to each other in a fourth, fifth and sixth etc. row and the fourth row is arranged on top of the third row, etc until the desired thickness of the spar cap structure is reached. Again, each row of fibre-reinforced composite elements are separated by an interlayer.

After the spar cap structure has been arranged on the first damage tolerant cover sheet, a second damage tolerant cover sheet is arranged on top of the spar cap structure such that the second outer surface of the second damage tolerant cover sheet is in contact with the second surface of the spar cap structure. Finally, the spar cap structure, the first damage tolerant cover sheet and the second damage tolerant cover sheet are infused with a first resin which is allowed to cure to form the pre-manufactured spar cap.

Thus, in a third aspect, the present invention relates to a method of providing a pre-manufactured spar cap for a wind turbine blade, the method comprising the steps of:
- providing a spar cap mould comprising a spar cap moulding surface,
- arranging a first damage tolerant cover sheet according to the first aspect of the present invention, on the spar cap moulding surface such that the first outer surface of the first damage tolerant cover sheet is in contact with the spar cap moulding surface,
- arranging a spar cap structure comprising a plurality of fibre-reinforced composite elements in stacked rows, separated by interlayers, on the first damage tolerant cover sheet, such that the second outer surface of the first damage tolerant cover sheet is in contact with the first surface of the spar cap structure,
- infusing the spar cap structure and the first damage tolerant cover sheet with a first resin, such as vinyl ester resin, epoxy ester resin or polyurethane resin.
- allowing the first resin to cure to form a pre-manufactured spar cap.

In some embodiments, the method further comprises arranging a second damage tolerant cover sheet on the spar cap structure such that the second outer surface of the second damage tolerant cover sheet is in contact with the second surface of the spar cap structure and wherein the step of infusing the spar cap structure and the first damage tolerant cover sheet with a first resin also includes infusing the second damage tolerant cover sheet with the first resin.

The present invention further relates to a wind turbine blade comprising a spar cap structure and a first and/or second damage tolerant cover layer. Thus, in a fourth aspect, the present invention relates to a wind turbine blade comprising

- an outer shell comprising a first plurality of shell fibre layers
- a spar cap structure comprising a plurality of fibre-reinforced composite elements arranged in stacked rows and separated by interlayers,
- a first damage tolerant cover sheet according to the first aspect of the present invention arranged at a first interface between the first plurality of shell fibre layers and a first surface of the spar cap structure such that the second outer surface of the first damage tolerant cover sheet is in contact with the first surface of the spar cap structure and such that the first outer surface of the first damage tolerant cover sheet is in contact with the first plurality of shell fibre layers, and wherein the spar cap structure and the first damage tolerant cover sheet are embedded in a first cured resin to form a premanufactured spar cap and wherein the first plurality of shell fibre layers and the premanufactured spar cap are embedded in a second cured resin, different from the first cured resin; or;

wherein the spar cap structure is embedded in the first cured resin to form a premanufactured spar cap and wherein the first plurality of shell fibre layers, the first damage tolerant cover sheet and the premanufactured spar cap are embedded in the second cured resin, different from the first cured resin.

In some embodiments, the wind turbine blade further comprises

- a second plurality of shell fibre layers
- a second damage tolerant cover sheet according to the first aspect of the present invention, at a second interface between the second plurality of shell fibre layers and a second surface of the spar cap structure, such that the second outer surface of the second damage tolerant cover sheet is in contact with the second surface of the spar cap structure and such that the first outer surface of the second damage tolerant cover sheet is in contact with the second plurality of shell fibre layers, and wherein the spar cap structure, the first damage tolerant cover sheet and the second damage tolerant cover sheet are embedded in the first cured resin to form a premanufactured spar cap and wherein the first plurality of shell fibre layers, the second plurality of shell fibre layers and the premanufactured spar cap are embedded in the second cured resin; or;

wherein the spar cap structure is embedded in a first cured resin to form a premanufactured spar cap and wherein the first and second plurality of shell fibre layers, the first damage tolerant cover sheet, the second damage tolerant cover sheet and the premanufactured spar cap are embedded in a second cured resin, different from the first cured resin.

Thus, in some embodiments, the wind turbine blade according to the fourth aspect of the present invention may comprise a premanufactured spar cap structure according to the second aspect of the present invention. However, in other embodiments the wind turbine blade comprises a premanufactured spar cap comprising a spar cap structure embedded in a cured resin and individual first and optionally also second damage tolerant cover sheets according to the first aspect of the present invention.

In some embodiments, first cured resin is a vinyl ester resin, a epoxy ester resin or a polyurethane resin, whereas the second cured resin is a polyester resin.

Polyester resin is much cheaper than conventionally used resins, such as epoxy ester and vinyl ester. However, the fracture resistance of the polyester-infused blade shell member parts is significantly lower than the fracture toughness of a vinyl ester or epoxy ester infused blade shell member. The adherence properties and strength of the pre-manufactured spar cap are particularly important. Thus, even though the prices of vinyl ester or epoxy ester are high compared to other resins, these are preferred for the pre-manufactured spar cap. By primarily using polyester resin for the remaining blade shell member and only using vinyl ester or epoxy ester resin for a few parts, such as the pre-manufactured spar cap, the costs of the blade shell member can be greatly reduced. Recent testing shows that the fracture toughness at the interface between a pre-manufactured spar cap infused with vinyl ester resin and the remaining blade shell member part infused with polyester resin is low. Furthermore, the fracture resistance of the polyester infused blade shell member parts is significantly lower than the fracture toughness of the vinyl ester or epoxy ester spar cap. Therefore, any cracks starting at the interface will probably propagate into the interface or kink into the polyester infused blade shell member parts having a lower fracture toughness than the vinyl ester or epoxy ester spar cap. However, with the arrangement of the damage tolerant cover sheets as disclosed herein at the interface between pre-manufactured spar cap and the remaining blade shell member parts, the interfacial strength can be twerked to be just less than the interfacial strength between the pre-manufactured spar cap and the remaining shell components. In this way, cracks will tend to go into the damage tolerant cover sheet where the crack ideally will arrest or at least slow down in propagation speed, instead of into the shell components. Thus, use of the damage tolerant cover sheet around a premanufactured spar cap in a wind turbine blade, decrease the propagation of cracks into the premanufactured spar cap and shell components and the blade shell member can be obtained at a reduced price.

The present invention further relates to two different methods for manufacturing a wind turbine blade shell member comprising a spar cap structure and a first and/or second damage tolerant cover layer. The first method is for manufacturing the wind turbine blade shell member comprising a premanufactured spar cap structure according to the second aspect of the present invention. The second method is for manufacturing a wind turbine blade shell member comprising a premanufactured spar cap comprising a spar cap structure embedded in a cured resin and individual first and optionally also second damage tolerant cover sheets according to the first aspect of the present invention.

In a fifth aspect, the present invention relates to a method of manufacturing a blade shell member for a wind turbine blade, the method comprising the steps of:

- providing a blade mould for the blade shell member, the blade mould comprising a moulding surface and a moulding cavity;
- arranging a first plurality of shell fibre layers on the moulding surface of the blade mould
- arranging a first damage tolerant cover sheet according to the first aspect of the present invention on top of the first plurality of shell fibre layers, such that a first outer surface of the first damage tolerant cover sheet is in contact with the first plurality of shell fibre layers;

providing a premanufactured spar cap comprising a spar cap structure comprising a plurality of fibre-reinforced composite elements arranged in stacked rows and separated by interlayers, wherein the spar cap structure and interlayers are embedded in a first cured resin;

arranging the premanufactured spar cap on top of the first damage tolerant cover sheet, such that a first surface of the spar cap structure is in contact with the second outer surface of the first damage tolerant cover sheet;

arranging a second damage tolerant cover sheet according to the first aspect of the present invention on top of the premanufactured spar cap, such that a second outer surface of the second damage tolerant cover sheet is in contact with a second surface of spar cap structure, arranging a second plurality of shell fibre layers on the second damage tolerant cover sheet, such that the second plurality of shell fibre layers is in contact with a first outer surface of the second damage tolerant cover sheet;

infusing the blade moulding cavity with a second resin;

allowing the second resin to cure to form the blade shell member.

In some embodiments, the premanufactured spar cap is provided by:

providing a spar cap mould comprising a moulding surface arranging a spar cap structure comprising a plurality of fibre-reinforced composite elements in stacked rows, separated by interlayers, on the moulding surface of the spar cap mould, infusing the spar cap structure with a first resin, allowing the first resin to cure to form the pre-manufactured spar cap.

In a sixth aspect, the present invention relates to a method of manufacturing a blade shell member for a wind turbine blade, the method comprising the steps of:

providing a blade mould for the blade shell member, the blade mould comprising a moulding surface and a moulding cavity;

arranging a first plurality of shell fibre layers on the moulding surface of the blade mould providing a premanufactured spar cap according to the second aspect of the present invention, arranging the premanufactured spar cap on top of the first plurality of shell fibre layers such that the first outer surface of the damage tolerant cover layer is in contact with the first plurality of shell fibre layers, arranging a second plurality of shell fibre layers on the premanufactured spar cap, such that the second plurality of shell fibre layers is in contact with a first outer surface of the second damage tolerant cover sheet;

infusing the blade moulding cavity with a second resin;

allowing the second resin to cure to form the blade shell member.

In some embodiments, the first and second plurality of shell fibre layers comprises glass fibres and/or carbon fibres. In some embodiments, the number of fibre-reinforced layers and further fibre-reinforced layers comprises unidirectional layers and/or biaxial layers and/or triaxial layers.

In some embodiments, the step of arranging the first and/or second plurality of shell fibre layers in the blade mould comprises arranging a plurality of preforms, each comprising a consolidated stack of shell fibre layers in the blade mould. The use of preforms may be advantageous, especially when manufacturing very large blade shell members, since wrinkles in the fibre-reinforced layers may be reduced.

In some embodiments, the step of arranging the first and/or second plurality of shell fibre layers on the blade moulding surface comprises arranging each of the first or second plurality of shell fibre layers on top of each other. The first plurality of shell fibre layers arranged on the blade moulding surface will become the outer shell of the blade shell member. Thus, preferably the first plurality of shell fibre layers should cover the entire moulding surface. The first and/or second plurality of shell fibre layers are between 1-100, preferably between 5-50, such as between 10-40.

In some embodiments, the method further comprises the step of arranging further blade shell member parts, such as sandwich core layers and/or shear webs in the blade mould cavity. The blade shell member parts referred to herein include all parts of the blade shell member.

In some embodiments, the step of infusing the blade mould cavity with resin is based on vacuum-assisted resin transfer moulding (VARMT). When the desired elements have been arranged in the blade mould, a vacuum bag may be arranged on top of the elements arranged on the moulding surface, and the vacuum bag may be sealed against the blade mould. Then, the blade mould cavity within the sealed vacuum bag may be infused with resin. Optionally, the step of resin infusion is followed by curing to obtain the finished blade shell member.

The method for providing a blade shell member may be for providing a suction side shell member or a pressure side shell member. It is to be understood that the same method may be used for providing a suction side shell member as well as a pressure side shell member. The only difference between providing the pressure side shell member and the suction side shell member would be the shape of the blade mould.

In a seventh aspect, the present invention relates to a method of manufacturing a wind turbine blade, the method comprising providing a pressure side shell half and a suction side shell half in accordance with the fifth or sixth aspect of the present invention over substantially the entire length of the wind turbine blade and subsequently closing and joining the shell halves for obtaining a closed shell.

In some embodiments, the method comprises providing a pressure side blade shell member and a suction side blade shell member over substantially the entire length of the wind turbine blade and subsequently closing and joining the pressure side blade shell member and the suction side blade shell member for obtaining a closed shell, wherein providing each of the pressure side blade shell member or the suction side blade shell member comprises the steps of:

providing a blade mould for a blade shell member, the blade mould comprising a moulding surface and a moulding cavity;

arranging a first plurality of shell fibre layers on the moulding surface of the blade mould arranging a first damage tolerant cover sheet according to claim 9 on top of the first plurality of shell fibre layers, such that a first outer surface of the first damage tolerant cover sheet is in contact with the first plurality of shell fibre layers;

providing a premanufactured spar cap comprising a spar cap structure comprising a plurality of fibre-reinforced composite elements arranged in stacked rows and separated by interlayers, wherein the spar cap structure and interlayers are embedded in a first cured resin;

arranging the premanufactured spar cap on top of the first damage tolerant cover sheet, such that a first surface of the spar cap structure is in contact with the second outer surface of the first damage tolerant cover sheet;

arranging a second damage tolerant cover sheet according to the first aspect of the present invention on top of the premanufactured spar cap, such that a second outer surface of the second damage tolerant cover sheet is in contact with a second surface of spar cap structure, arranging a second plurality of shell fibre layers on the second damage tolerant cover sheet, such that the second plurality of shell fibre layers is in contact with a first outer surface of the second damage tolerant cover sheet;

infusing the blade moulding cavity with a second resin;

allowing the second resin to cure to form the blade shell member.

In some embodiments, the method comprises providing a pressure side blade shell member and a suction side blade shell member over substantially the entire length of the wind turbine blade and subsequently closing and joining the pressure side blade shell member and the suction side blade shell member for obtaining a closed shell, wherein providing each of the pressure side blade shell member or the suction side blade shell member comprises the steps of:

providing a blade mould for the blade shell member, the blade mould comprising a moulding surface and a moulding cavity;

arranging a first plurality of shell fibre layers on the moulding surface of the blade mould providing a premanufactured spar cap according to the first aspect of the present invention, arranging the premanufactured spar cap on top of the first plurality of shell fibre layers such that the first outer surface of the damage tolerant cover layer is in contact with the first plurality of shell fibre layers, arranging a second plurality of shell fibre layers on the premanufactured spar cap, such that the second plurality of shell fibre layers is in contact with a first outer surface of the second damage tolerant cover sheet;

infusing the blade moulding cavity with a second resin;

allowing the second resin to cure to form the blade shell member.

It will be understood that any of the above-described features may be combined in any embodiment of the invention. In particular, embodiments described with regard to the damage tolerant cover sheet may also apply to the premanufactured spar cap or wind turbine blade comprising one or more damage tolerant cover sheets. In the same way, embodiments described with regard to the premanufactured spar cap may also apply to the turbine blade. Furthermore, the embodiments described with regard to the method of manufacturing a premanufactured spar cap may also be applied to the method of manufacturing a blade shell member or a wind turbine blade, and vice versa. Finally, embodiments described with regard to the pre-manufactured spar cap and wind turbine blade shell member may also be applied to the method of manufacturing a premanufactured spar cap, a blade shell member or a wind turbine blade and vice versa.

DETAILED DESCRIPTION OF THE INVENTION

The invention is explained in detail below with reference to embodiments shown in the drawings, which shall not be construed as limitations.

Figure 2:
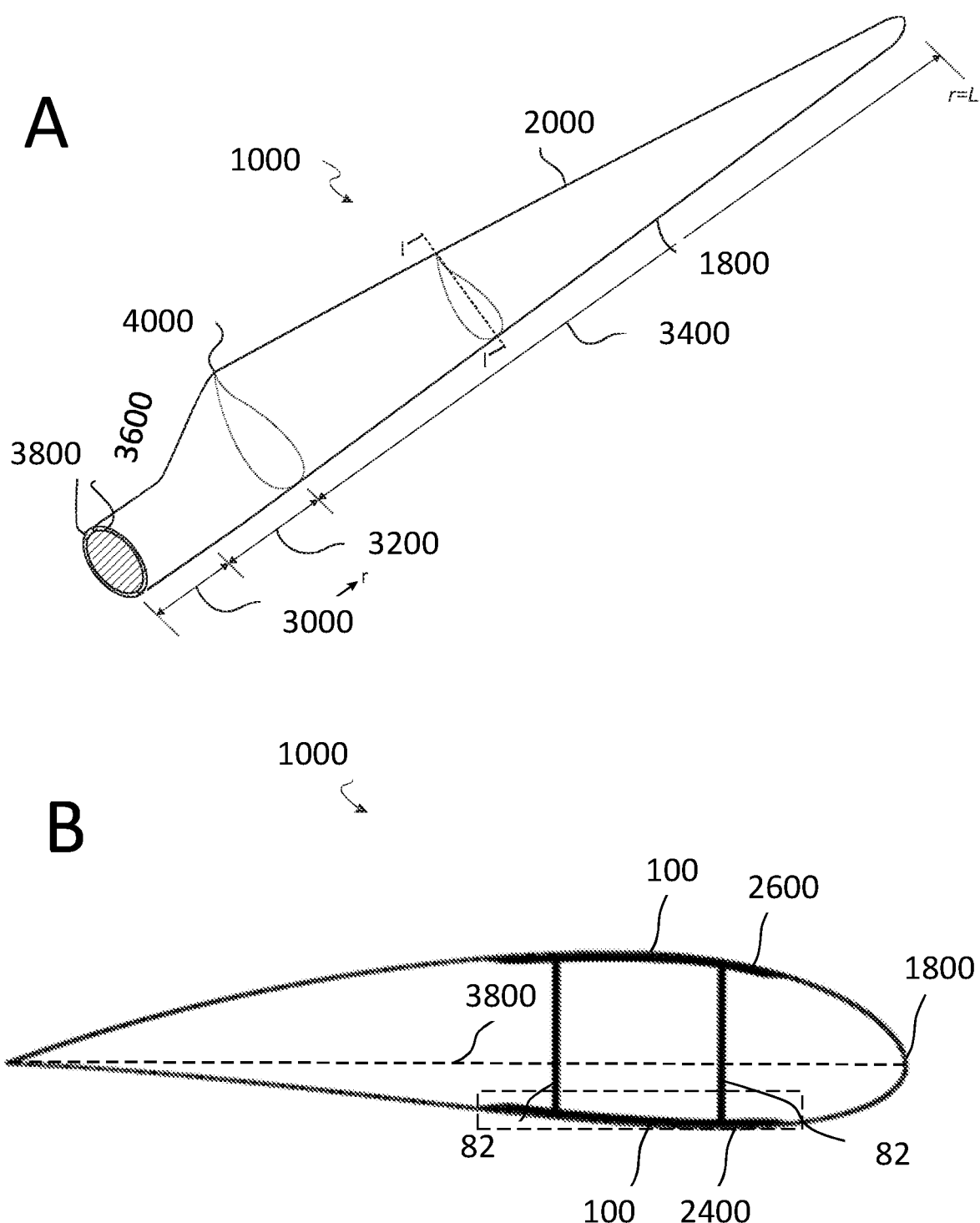
Figure 3:
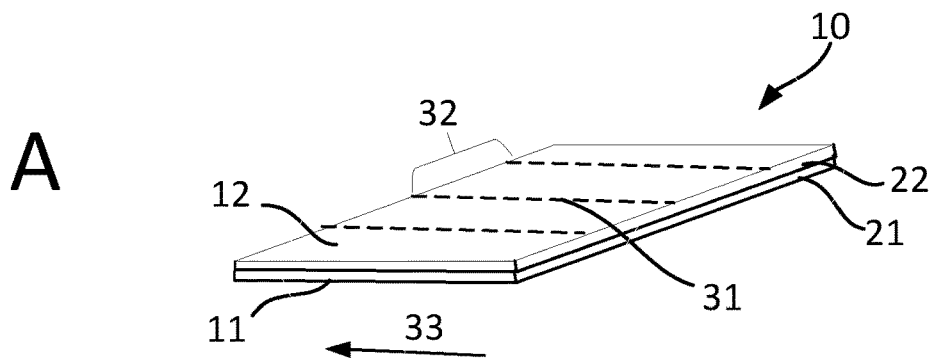
Figure 3:
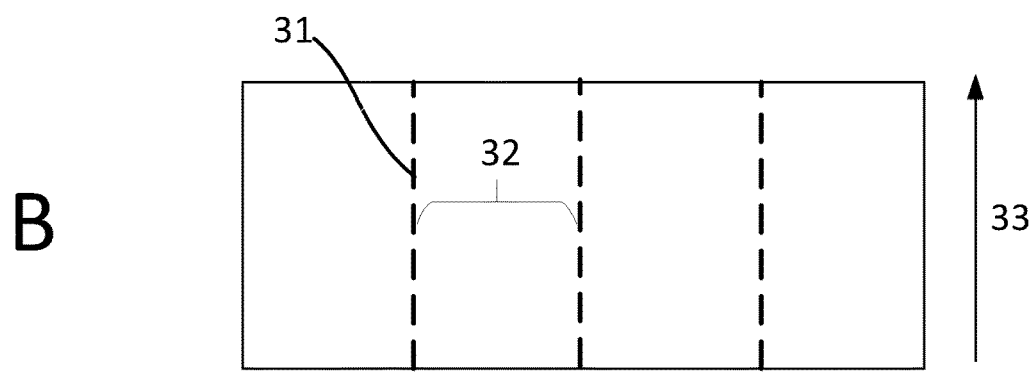
Figure 3:
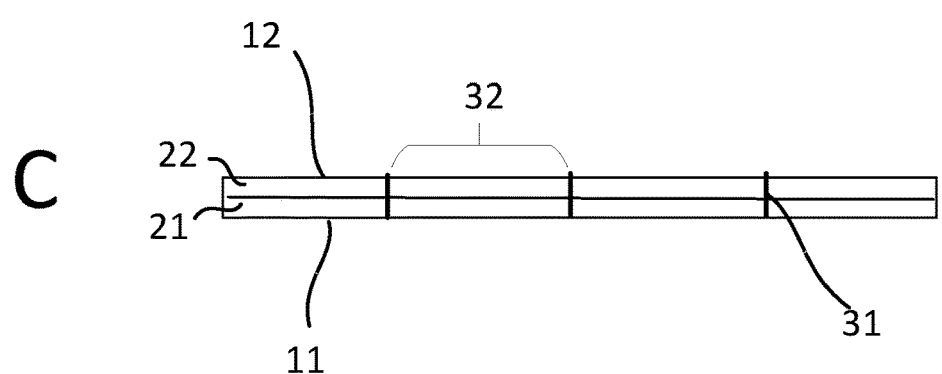
Figure 4:
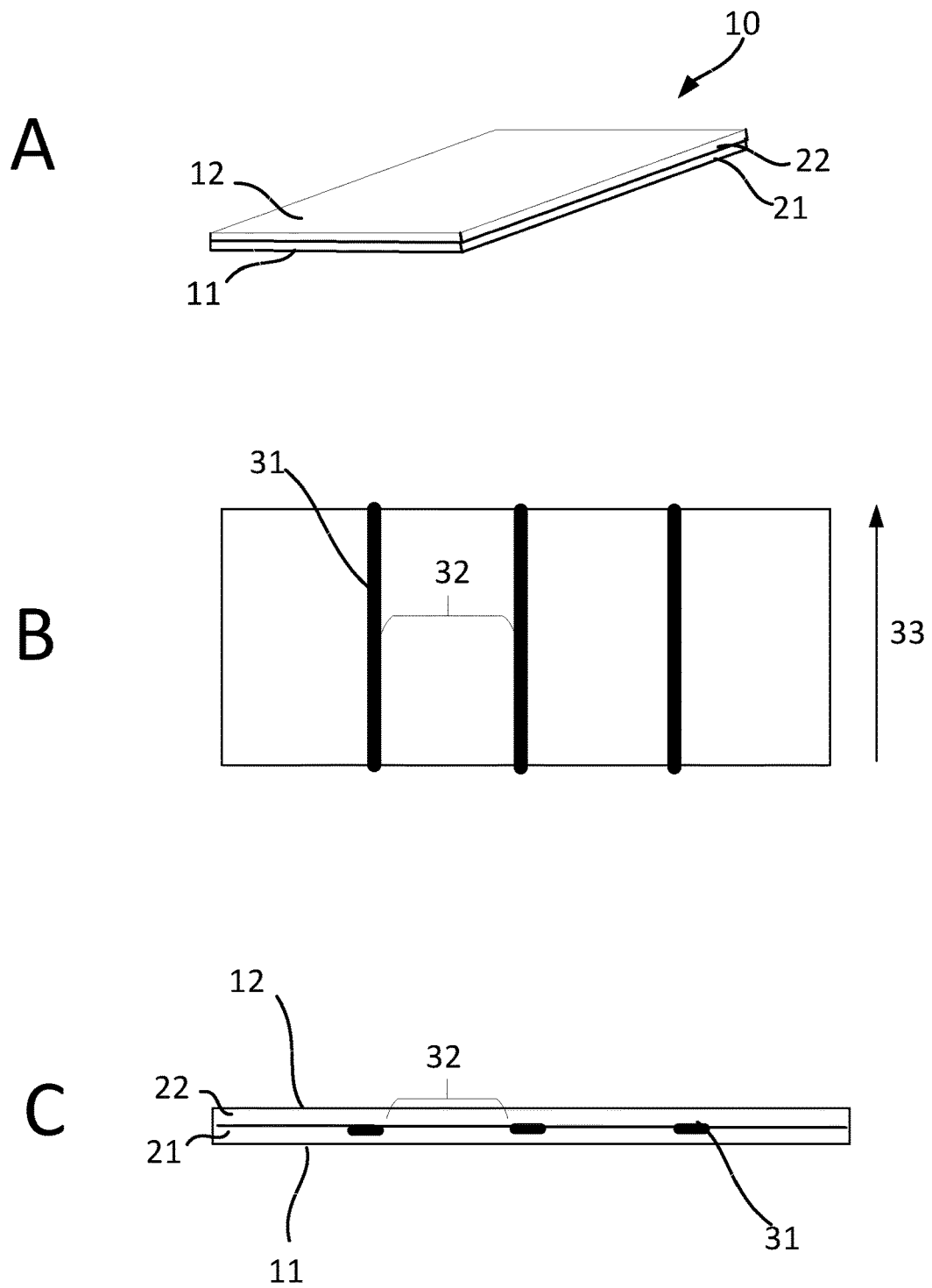
Figure 5:
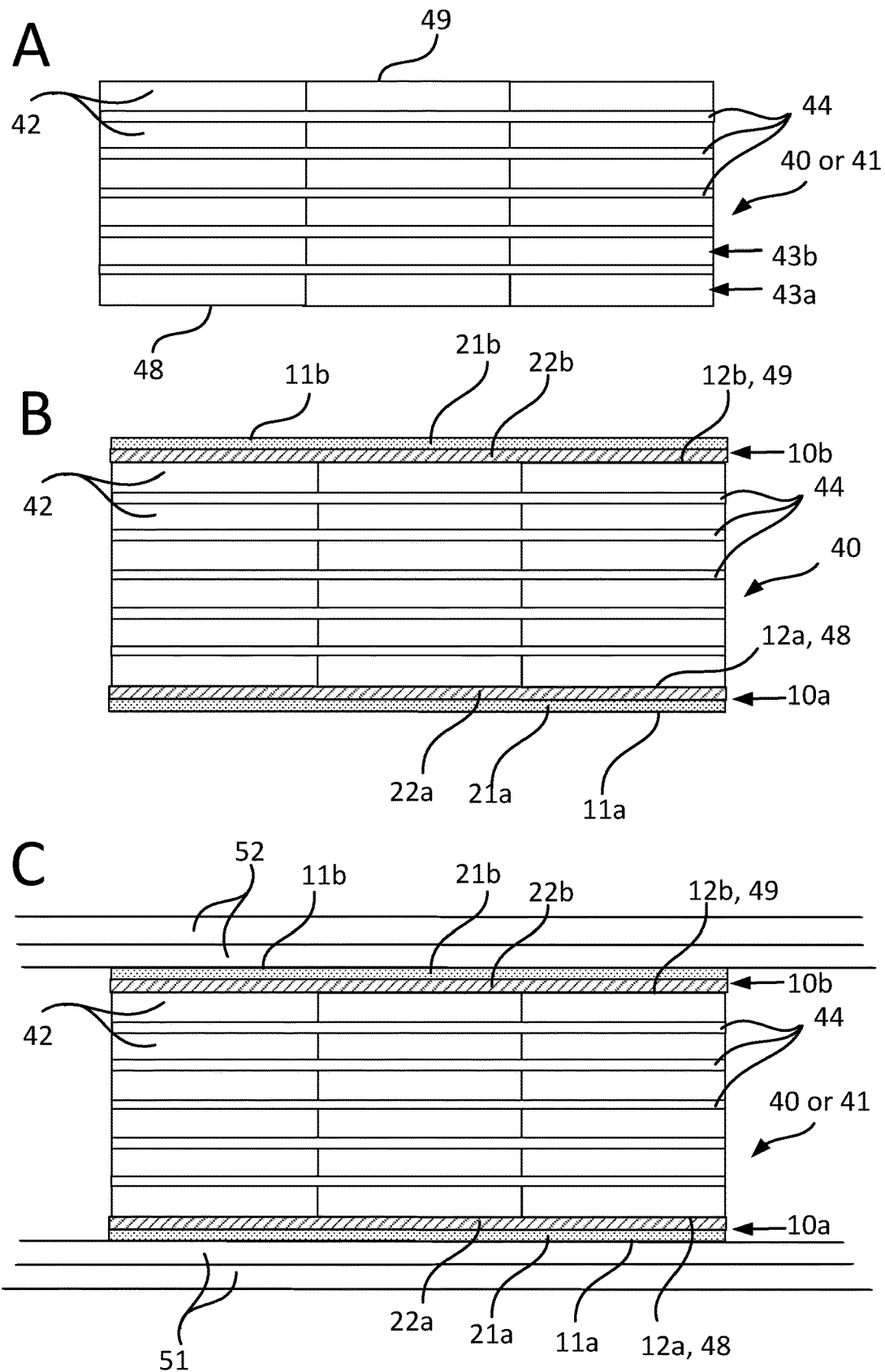
Figure 6:
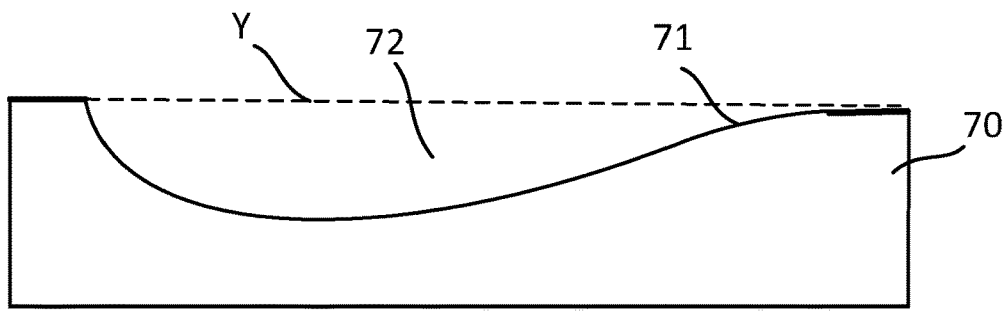
Figure 6:
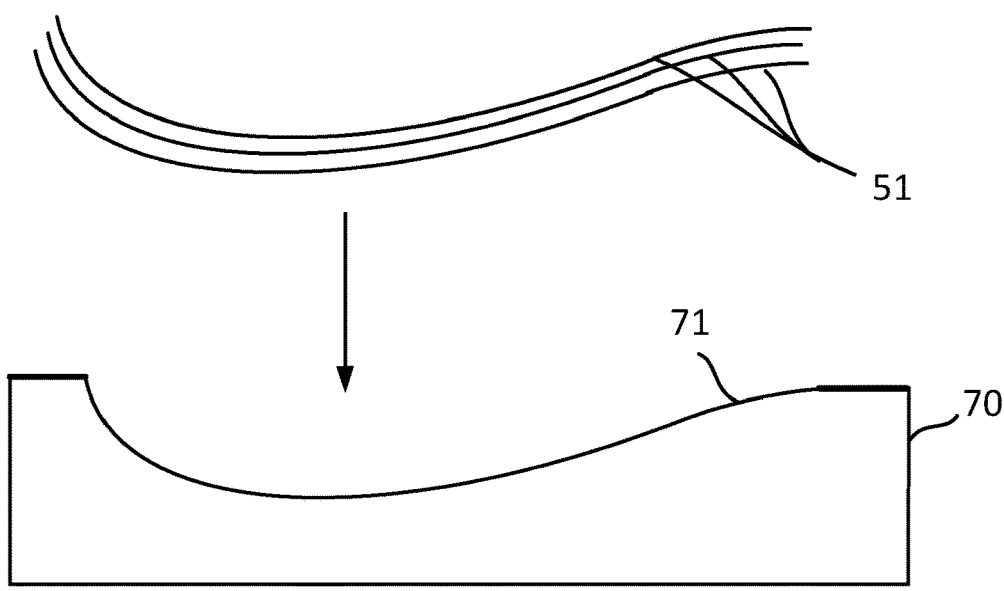
Figure 6:
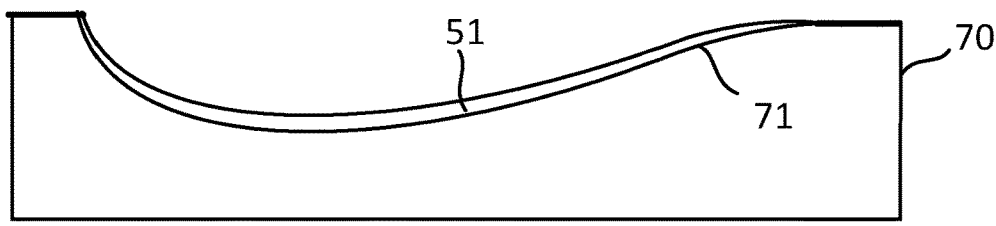
Figure 6:
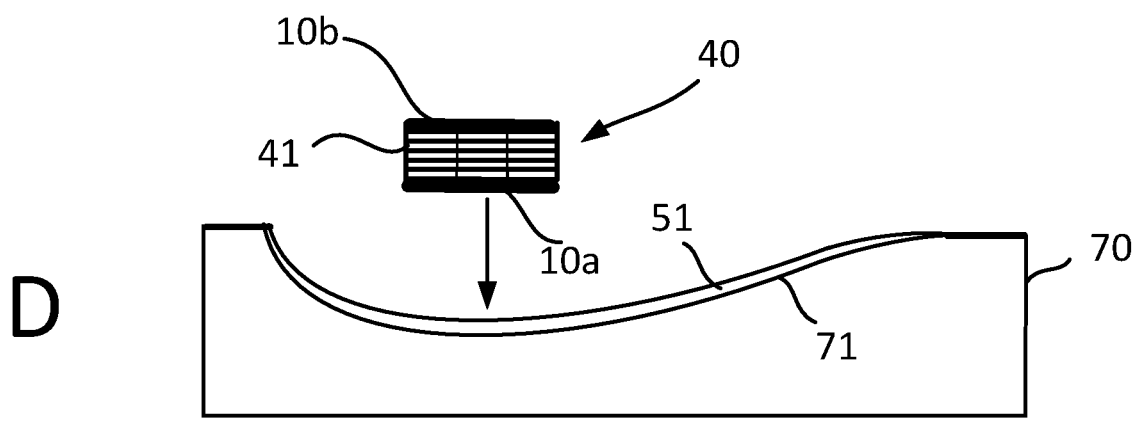
Figure 6:
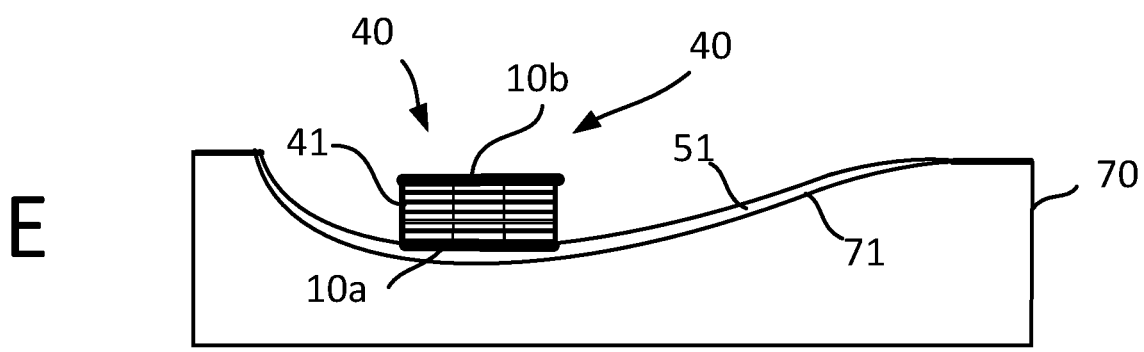
Figure 6:
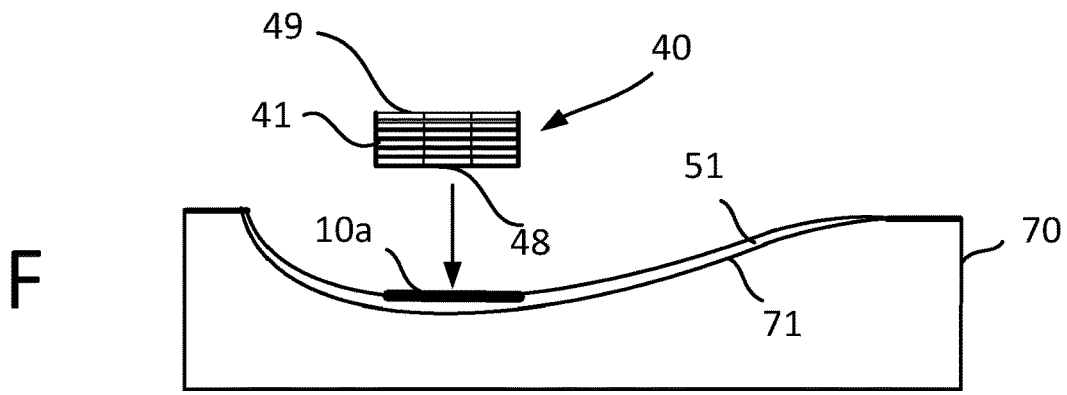
Figure 6:
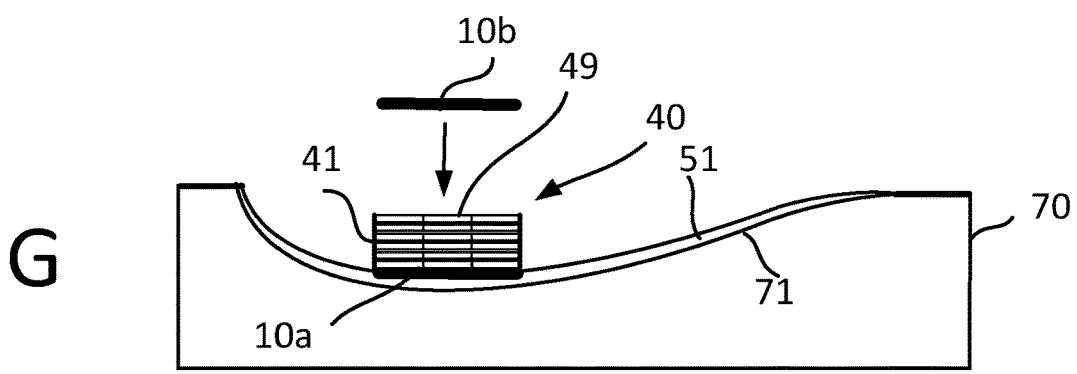
Figure 6:
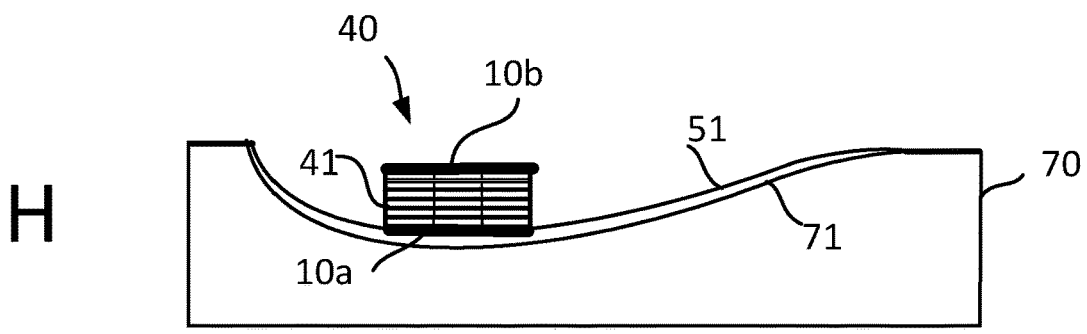
Figure 6:
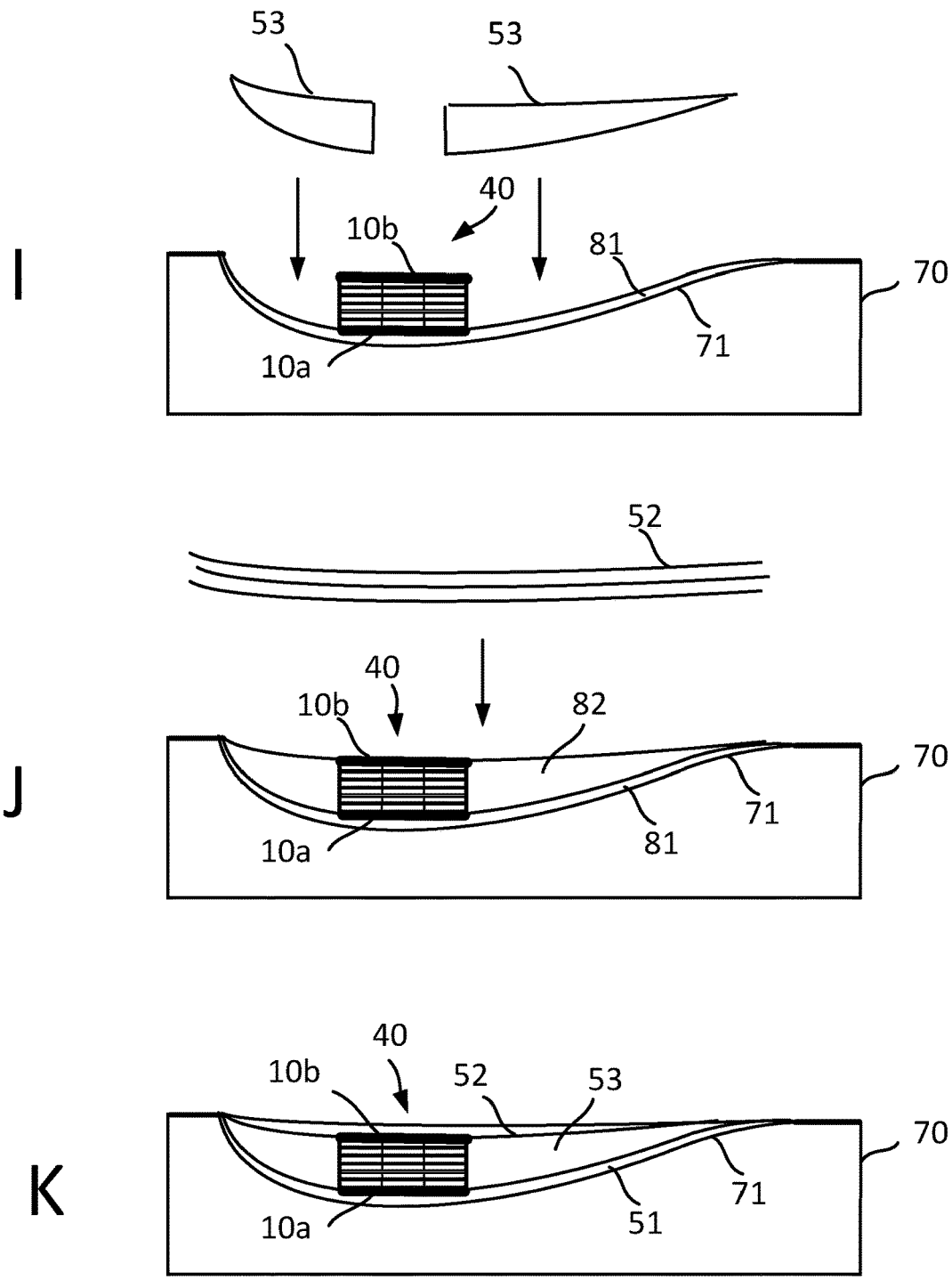

FIG. 1 is a schematic diagram illustrating a wind turbine,

FIG. 2 is a schematic diagram illustrating a wind turbine blade and a spar cap structure arranged within the wind turbine blade, FIG. 3 is a schematic diagram illustrating a damage tolerant cover sheet according to a first embodiment of the present invention, FIG. 4 is a schematic diagram illustrating a damage tolerant cover sheet according to a second embodiment of the present invention, FIG. 5 is a schematic diagram illustrating a cross-sectional view of a premanufactured spar cap according to prior art (FIG. 5A), cross-sectional view of a premanufactured spar cap covered by a first and second damage tolerant cover sheet according to an embodiment of the present invention (FIG. 5B) and a cross-sectional view of part of a wind turbine blade comprising a first and second plurality of shell fibre layers as well as the premanufactured spar cap covered by a first and second damage tolerant cover sheet according to an embodiment of the present invention (FIG. 5C), and FIG. 6 is a schematic diagram illustrating a method of manufacturing a wind turbine blade shell member according to two different embodiments of the present invention. FIGS. 6A-6E and 6I-6K illustrate the first embodiment, whereas FIGS. 6A-6C and 6F-6H illustrate the second embodiment.

DETAILED DESCRIPTION

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000 according to the invention. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root region 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position where the blade 100 has its largest chord length. The shoulder 4000 is typically provided at the boundary between the transition region 3200 and the airfoil region 3400.

It should be noted that the chords of different sections of the blade normally do not lie in a common plane since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross-sectional view of an exemplary wind turbine blade 1000, e.g. a cross-sectional view of the airfoil region of the wind turbine blade 1000. The wind turbine blade 1000 comprises a leading edge 1800, a trailing edge 2000, a pressure side 2400, a suction side 2600, a first spar cap 100 and a second spar cap 100. The wind turbine blade 1000 comprises a chord line 3800 between the leading edge 1800 and the trailing edge 2000. The wind turbine blade 1000 comprises shear webs 82, such as a leading edge shear web and a trailing edge shear web. The shear webs 82 could alternatively be a spar box with spar sides, such as a trailing edge spar side and a leading edge spar side. The spar caps 100 may comprise carbon fibres while the rest of the shell parts 2400, 2600 may comprise glass fibres.

FIGS. 3 and 4 are schematic diagrams illustrating different views of a damage tolerant cover sheet 10 according to two different embodiments of the present invention. FIGS. 3A and 4A are a three-dimensional view, FIGS. 3B and 4B are a top view and FIGS. 3C and 4C are a side view of a damage tolerant cover sheet 10 in accordance with the present invention.

The damage tolerant cover sheet 10 according to the present invention is configured to be used in a wind turbine blade 1000. Particularly, the damage tolerant cover sheet 10 of the invention is configured to be arranged at the interface between a pre-manufactured spar cap 40 infused with a first resin, such as vinyl ester resin, and the remaining shell components of a wind turbine blade infused with a second resin, such as polyester resin. The damage tolerant cover sheet 10 should preferably cover at least the two largest surfaces 48, 49 of the pre-manufactured spar cap 40, including any tapering ends of the pre-manufactured spar cap 40. By having a damage tolerant cover sheet 10 at the interface between the premanufactured spar cap 40 with a low cohesive strength and fracture toughness compared to the remaining shell components, any cracks starting at the interface between the premanufactured spar cap 40 and the remaining shell components will propagate into the damage tolerant cover sheet 10 with low cohesive strength but high fracture toughness.

As can be seen in FIGS. 3 and 4, the damage tolerant cover sheet 10 according to the present invention comprises a first damage tolerant fibre layer 21 and a second damage tolerant fibre layer 22. The first damage tolerant fibre layer 21 forms part of a first outer surface of the damage tolerant cover sheet 11 and a second damage tolerant fibre layer 22 forms part of a second outer surface of the damage tolerant cover sheet 12. The first outer surfaces of the damage tolerant cover sheet 11 is opposite to the second outer surface of the damage tolerant cover sheet 12 and the first and second outer surface of the damage tolerant cover sheet 11, 12 are the two largest surfaces of the damage tolerant cover sheet 10.

The first damage tolerant fibre layer 11 preferably comprises a first plurality of fibres being unidirectionally arranged along a first fibre direction and the arrangement of the first plurality of fibres are maintained relative to each other by a second plurality of stitching rows and/or by a second binding agent. The distance between the second plurality of stitching rows in the first damage tolerant fibre layer 11 is not important. Furthermore, the second binding agent need not be arranged in specific areas. The importance of the second plurality of stitching rows and second binding agent is just to maintain the fibres in the first damage tolerant fibre layer 11 relative to each other. In preferred embodiments, the first damage tolerant fibre layer 11 is a unidirectional glass fibre layer or a biaxial glass fibre layer.

The second damage tolerant fibre layer 12 preferably comprises a second plurality of fibres being randomly arranged within the second damage tolerant fibre layer. The arrangement of the second plurality of fibres is maintained relative to each other by a third binding agent. Again, the importance of the third binding agent is just to maintain the fibres in the second damage tolerant fibre layer 12 relative to each other. In preferred embodiments, the second fibre layer 12 is a chopped strand mat (CSM) or a continuous filament mat (CFM) comprising or essentially consisting of glass fibres.

The first damage tolerant fibre layer 11 and the second damage tolerant fibre layer 12 are attached to each other in attachment areas 31.

In the embodiment illustrated in FIG. 3, the first and second damage tolerant fibre layers 11, 12 are attached to each other by a first plurality of stitching rows in the attachment areas 31. The attachment areas 31 are parallelly arranged along a first attachment direction 33 of the damage tolerant cover sheet 10.

In the embodiment illustrated in FIG. 4, the first and second damage tolerant fibre layers 11, 12 are attached to each other by a first binding agent arranged between the first and second damage tolerant fibre layer 11, 12 in the attachment areas 31. The attachments areas 31 are parallelly arranged along a first attachment direction 33 of the damage the damage tolerant cover sheet 10.

Importantly, the attachments areas 31 are separated from each other by a distance 32 between 1-5 cm, preferably around 2.5 cm. In this way, the fibres in the damage tolerant cover sheet 10 can be pulled out over a long distance and the fibres being teared out can create a large bridging zone. When the damage tolerant cover sheet 10 is used at the interface between a premanufactured spar cap 40 and the remaining shell components, the distance 32 between the attachment areas 31 can twerk the interfacial strength to be just less than the interfacial strength between the pre-manufactured spar cap 40 and the remaining shell components, meaning that cracks will tend to go into the damage tolerant cover sheet 10 instead of into the shell components.

In embodiments where the first and second damage tolerant fibre layers 11, 12 are attached to each other by a first plurality of stitching rows, each attachment area 31 is defined by a thread making up a stitching row. In such embodiments, the distance 32 between the attachment areas should be measured from the stitching thread in one stitching row to an adjacent stitching thread in another stitching row. The distance 32 should be measured such that it is taken perpendicular on the first attachment direction 33 of the two adjacent stitching rows as illustrated by the reference 32. In embodiments where the first and second damage tolerant fibre layers 11, 12 are attached to each other by a first plurality of stitching rows, each attachment area 31 is defined by the area covered by binding agent. In embodiments where the first and second damage tolerant fibre layers 11, 12 are attached to each other by a first binding agent, the attachment areas 31 are larger than when the first and second damage tolerant fibre layers 11, 12 are attached to each other by a plurality of stitching rows. This is because a line of binding agent with the same width as a stitching thread, would not be sufficient to bind the two layers together. Thus, in such embodiments, the attachment areas 31 have a width larger than a stitching thread, such as at least 10 times the width of a stitching thread. In such embodiments, the distance 32 between two adjacent attachment areas 31 should be measured from an outer edge (such as a left edge) of one attachment area to an opposite outer edge (such as a right edge) of an adjacent attachment area. The distance 32 should be measured such that it is taken perpendicular on the first attachment direction 33 of the two adjacent attachment areas 31 as illustrated by the reference 32.

Preferably, a fibre angle between the first attachment direction 33 of the first damage tolerant fibre sheet 10 and the first fibre direction of the plurality of first fibres in the first damage tolerant fibre layer 11 is between 40 degrees and 150 degrees, preferably 90 degrees.

The area weight of the damage tolerant cover sheet 10 should be between 400 gsm and 1000 gsm, preferably 700 gsm.

FIG. 5A is a schematic diagram illustrating a spar cap structure 41 comprising a plurality of fibre-reinforced composite elements 42 arranged in stacked rows 43 and separated by interlayers 44.

The stacked rows of fibre-reinforced composite elements 43 illustrated in FIG. 5A includes six rows each comprising three fibre-reinforced composite elements 42 arranged adjacent to each other. The six rows are stacked upon each other. Each row of fibre-reinforced elements 43 is separated from an adjacent row of fibre-reinforced elements 43 by an interlayer 44. Preferably, the fibre-reinforced composite elements 42 are longitudinally extending pultruded carbon planks with a substantially square cross-section. The interlayer 44 may be any material promoting resin flow between the fibre-reinforced composite elements 42 and may comprise one or more fibre layers, each comprising glass fibres and/or carbon fibre and/or monofilaments etc.

The spar cap structure 41 has a length, a width and a height, wherein the length is longer than the width and the width is longer than the height. Furthermore, the spar cap structure 41 may have a tapering structure at a first and second end (not illustrated). The spar cap structure 41 has a first and second surface 48, 49. The first and second surfaces of the spar cap structure 48, 49 are the two largest surfaces of the spar cap structure 41, and the second surface of the spar cap structure 49 is opposite the first surface of the spar cap structure 48. The second surface 49 may include the surface of the tapering structure at the first and second end of the spar cap structure 41.

When the spar cap structure 41 is embedded in a first cured resin it constitutes a premanufactured spar cap 40. Such a spar cap in itself does not form part of the invention. However, a wind turbine blade 1000 comprising such a premanufactured spar cap 40 as well as a first damage tolerant cover sheet 10a and a second damage tolerant cover sheet 10b in accordance with FIG. 3 or 4 arranged to cover the larger surfaces of the spar cap structure 40, constitute part of the invention. A cross-sectional close up view of part of a wind turbine blade shell member comprising a first and second plurality of shell fibre layers 51, 52 as well as a first and second damage tolerant cover sheet 10a, 10b as described in relation with FIG. 3 or 4, is illustrated in FIG. 5C. The close up view shows the part of a wind turbine blade 1000 illustrated in FIG. 2A within the square of dotted lines.

As can be seen in FIG. 5C, the first damage tolerant cover sheet 10a should be arranged at the interface between the first surface of the premanufactured spar cap 48 and a first plurality of shell fibre layers 51 and the second damage tolerant cover sheet 10b should be arranged at the interface between the second surface of the premanufactured spar cap 49 and a second plurality of shell fibre layers 52 of the wind turbine blade. The first damage tolerant cover sheet 10a should be arranged such that the second outer surface of the first damage tolerant cover sheet 12a i.e., the second damage tolerant fibre layer, is in contact with the first surface of the spar cap structure 48, whereas the first outer surface of the first damage tolerant cover sheet 11a i.e., the first damage tolerant fibre layer, is in contact with the first plurality of shell fibre layers 51. Furthermore, the second damage tolerant cover sheet 10b should be arranged such that the second outer surface of the second damage tolerant cover sheet 12b i.e., the second damage tolerant fibre layer, is in contact with the second surface of the spar cap structure 49, whereas the first outer surface of the second damage tolerant cover sheet 11b i.e., the first damage tolerant fibre layer, is in contact with the second plurality of shell fibre layers 52.

In embodiments where the wind turbine blade 1000 comprises a premanufactured spar cap 40 comprising a spar cap structure 41 as described in relation to FIG. 5A embedded in the first cured resin, the wind turbine blade components, including the first and/or second plurality of shell fibre layers 51, 52, the first and/or second damage tolerant cover sheets 10a, 10b and the premanufactured spar cap 40 are embedded in a second cured resin, such as polyester resin, to adhere all the turbine blade components together.

FIG. 5B is a schematic diagram illustrating a pre-manufactured spar cap 40 for a wind turbine blade 1000 according to an embodiment of the present invention.

The pre-manufactured spar cap 40 according to the present invention comprises a spar cap structure 41 as described in relation to FIG. 5A. Furthermore, the pre-manufactured spar cap 40 comprises a first damage tolerant cover layer 10a and/or a second damage tolerant cover layer 10b as described in relation to FIG. 3 or 4. In FIG. 5B, the spar cap structure 41, the first damage tolerant cover sheet 10a and the second damage tolerant cover sheet 10b are all embedded in a first cured resin, preferably vinyl ester resin, epoxy ester resin or polyurethane resin (not illustrated). The cured resin holds the spar cap structure 41, the first damage tolerant cover sheet 10a and the second damage tolerant cover sheet 10b together in the desired arrangement. Together the spar cap structure 40, the first damage tolerant cover sheet 10a and the second damage tolerant cover sheet 10b and the cured resin make up a premanufactured spar cap 40 according to an embodiment of the present invention.

The first damage tolerant cover sheet 10a is arranged such that the second outer surface of the first damage tolerant cover sheet 12a i.e., the second damage tolerant fibre layer, is in contact with the first surface of the spar cap structure 48. Furthermore, the second damage tolerant cover sheet 10b is arranged such that the second outer surface of the second damage tolerant cover sheet 12b i.e., the second damage tolerant fibre layer, is in contact with the second surface of the spar cap structure 49.

A wind turbine blade comprising a premanufactured spar cap 40 as described in relation to FIG. 5B, as well as an outer shell comprising a first plurality of shell fibre layers 51 and/or a second plurality of shell fibre layers 52 also forms part of the present invention. Such a wind turbine blade 1000 will be similar to that described in relation to FIG. 5C, the only difference being that the first and second damage tolerant cover sheets 10a, 10b are part of the premanufactured spar cap 40 i.e. the spar cap structure 41, the first damage tolerant cover sheet 10a and the second damage tolerant cover sheet 10b, are all embedded in the first cured resin. Furthermore, the premanufactured spar cap 40, the first plurality of shell fibre layers 51 and second plurality of shell fibre layers 52 are all embedded in a second cured resin to adhere these components together and form a blade shell member for a wind turbine blade 1000.

In other words, the premanufactured spar cap 40 is arranged between the first and second plurality of shell fibre layers 51, 52 in the wind turbine blade 1000 such that the first damage tolerant cover sheet 10a is arranged a first interface between the first plurality of shell fibre layers 51 and a first surface of the spar cap structure 48 and such that the second damage tolerant cover sheet 10b is arranged at a second interface between the second plurality of shell fibre layers 52 and a second surface of the spar cap structure 49.

In some embodiments, the premanufactured spar cap comprises the spar cap structure 41, the first damage tolerant cover sheet 10a and the second damage tolerant cover sheet 10b, which are all embedded in a first cured resin and the wind turbine blade comprises the first plurality of shell fibre layers 51, the second plurality of shell fibres 52 and the premanufactured spar cap structure 41 all embedded in a second cured resin to adhere these elements together in the desired arrangement within the wind turbine blade 1000.

In other embodiments, the first and/or second damage tolerant cover sheets 10a, 10b does not form part of the pre-manufactured spar cap 40. In such embodiments, the premanufactured spar cap 40 only comprises the spar cap structure 41 embedded in the first cured resin, whereas the first and second damage tolerant cover sheets 10a, 10b are adhered to the premanufactured spar cap 40 with a second cured resin together with the first plurality of shell fibre layers 51 and the second plurality of shell fibre layers 52.

It should be noted that it is within the scope of the present invention that further surfaces, such as the side surfaces and/or end surfaces of the premanufactured spar cap 40, may also be covered by one or more damage tolerant cover sheets 10 as described in relation to FIG. 3 or 4.

Reference is made to FIGS. 6A-6K, illustrating the process of manufacturing a wind turbine blade shell according to the two embodiments described above i.e. one where the first and second damage tolerant cover sheets 10a, 10b form parts of the premanufactured spar cap 40 embedded in the first cured resin (FIG. 6A-6F and FIGS. 6I-6K) and one where the first and second damage tolerant cover sheets 10a, 10b form part of the remaining blade shell elements and are embedded with the first and second plurality of shell fibre layers 51, 52 in the second cured resin (FIG. 6A-6C and FIGS. 6F-6K)

FIG. 6A is a schematic diagram illustrating a cross-sectional view of a blade mould 70 for a wind turbine blade shell half. The thick black lines illustrate substantially straight areas of the blade mould 70 between which a plane Y extends. The area between the plane Y and the moulding surface 71 is defined as the moulding cavity 72.

FIG. 6B is a schematic diagram illustrating an arrangement of a first plurality of shell fibre layers 51 on the blade moulding surface 71 of the blade mould 70. In FIG. 6B, the number of the first plurality of shell fibre layers 51 is three. The first plurality of shell fibre layers 51 are arranged on top of each other, forming a thin outer shell of the blade shell member, as illustrated in FIG. 6C. In reality, the outer shell is much thinner than illustrated in FIG. 6C. However, for illustrative purposes, the outer shell proportions are exaggerated. Furthermore, in reality, more than three fibre-reinforced layers 51 may be arranged on top of each other, but for an illustrative purpose, only three layers are shown.

FIG. 6D-6E is a schematic diagram illustrating how a pre-manufactured spar cap 40 as described in relation to FIG. 5B is arranged in the blade mould 70. The premanufactured spar cap 40 is arranged on top of the first plurality of shell fibre layers 51 such that the first outer surface of the first damage tolerant cover sheet 11a is in contact with the first plurality of shell fibre layers 51.

FIG. 6F-6H is a schematic diagram illustrating how a pre-manufactured spar cap 40 comprising only the spar cap structure 41 embedded in a first cured resin as well as the first and second plurality of shell fibre layers 51, 52 are arranged in the wind turbine blade mould 70.

As can be seen in FIG. 6F, a first damage tolerant cover sheet 10a as described in relation to FIG. 3 or 4 is arranged on top of the first plurality of shell fibre layers 51, such that a first outer surface of the first damage tolerant cover sheet 11a is in contact with the first plurality of shell fibre layers 51. Then, as illustrated in FIG. 6G, the premanufactured spar cap is arranged on top of the first damage tolerant cover sheet 10a, such that a first surface of the spar cap structure 48 is in contact with the second outer surface of the first damage tolerant cover sheet 12a. Finally, as illustrated in FIG. 6H, a second damage tolerant cover sheet 10b as described in relation to FIG. 3 or 4 is arranged on top of the premanufactured spar cap 40, such that a second outer surface of the second damage tolerant cover sheet 12b is in contact with a second surface of the spar cap structure 49.

FIG. 6I illustrates that after arrangement of the first plurality of shell fibre layers 51, the spar cap structure 41 and the first and second damage tolerant fibre sheets 10a, 10b within the blade mould (either as described in relation to FIG. 6A-6E or as described in relation to FIGS. 6A-6C and 6F-6H), then further blade components, such as core elements and/or shear webs 53, may subsequently be arranged in the blade mould.

FIG. 6J illustrates that a second plurality of shell fibre layers 52 are arranged on the second damage tolerant cover sheet 10b, such that the second plurality of shell fibre layers 52 is in contact with a first outer surface of the second damage tolerant cover sheet 11b. After this step, the blade moulding cavity 71 is infused with a second resin (not illustrated) to bind all elements within the blade mould together and the second resin is allowed to cure to form a blade shell member.

FIGS. 6A-6K illustrates the manufacture of a pressure side shell part. It is recognised that a suction side shell part may be manufactured in a similar way. The two shell parts can subsequently be assembled to form a closed aerodynamic shell i.e., a wind turbine blade 1000 according to an embodiment of the invention, e.g. with shear webs between the spar caps as illustrated in FIG. 2B.

It should be emphasised that the figures are schematic only and that in particular the thickness of the different elements in FIG. 6 is exaggerated. Normally, the blade shell and spar cap are much thinner, e.g. as shown in FIG. 2B. Furthermore, the dimensions of the different elements in the figures, particularly FIG. 6 are not necessarily in the correct dimensions relative to each other.

Itemized list of different aspects and embodiments according to the present invention:

1. A damage tolerant cover sheet (10) comprising
   a first damage tolerant fibre layer (21) forming part of a first outer surface of the damage tolerant cover sheet (11); and
   a second damage tolerant fibre layer (22) forming part of a second outer surface of the damage tolerant cover sheet (12), the second outer surface of the damage tolerant cover sheet being opposite to the first outer surface of the damage tolerant cover sheet, wherein the first damage tolerant fibre layer (21) and the second damage tolerant fibre layer (22) are attached to each other in attachment areas (31) by a first plurality of stitching rows and/or by a first binding agent arranged between the first and second damage tolerant fibre layer in the attachment areas (31), and wherein the attachments areas (31) are separated from each other by a distance (32) between 1-5 cm, preferably around 2.5 cm.

2. A damage tolerant cover sheet (20) according to item 1, wherein the first damage tolerant fibre layer (21) comprises a first plurality of fibres being unidirectionally arranged along a first fibre direction and the arrangement of the first plurality of fibres (27) are maintained relative to each other by a second plurality of stitching rows and/or by a second binding agent and wherein the second damage tolerant fibre layer (22) comprising a second plurality of fibres being randomly arranged, wherein the arrangement of the second plurality of fibres are maintained relative to each other by a third binding agent.

3. The damage tolerant cover sheet (20) according to any of the preceding items, wherein the first damage tolerant fibre layer is a unidirectional or biaxial glass fibre layer and the second fibre layer is a chopped strand mat (CSM) or a continuous filament mat (CFM) comprising or essentially consisting of glass fibres.

4. The damage tolerant cover sheet (20) according to any of the preceding items, wherein the first plurality of attachment areas are parallel to each other and arranged along a first attachment direction.

5. The damage tolerant cover sheet (20) according to any of the preceding items, wherein the area weight of the damage tolerant cover sheet is between 400 gsm and 1000 gsm, preferably 700 gsm.

6. A pre-manufactured spar cap for a wind turbine blade comprising
   a spar cap structure comprising a plurality of fibre-reinforced composite elements arranged in stacked rows and separated by interlayers,
   a first damage tolerant cover sheet (10*a*) according to any of items 1-5,
wherein the first damage tolerant cover sheet (10*a*) is arranged such that the second outer surface of the first damage tolerant cover sheet (12*a*) is in contact with a first surface of the spar cap structure (48); and
wherein the spar cap structure (48) and the first damager tolerant cover sheet (10*a*) are embedded in a first cured resin.

7. A pre-manufactured spar cap according to item 6, wherein the pre-manufactured spar cap further comprises a second damage tolerant cover sheet (10*b*) according to any of items 1-5,
   wherein the second damage tolerant cover sheet (10*b*) is arranged such that the second outer surface of the second damage tolerant cover sheet (12*b*) is in contact with the second surface of the spar cap structure (49) and;
   wherein the spar cap structure (48), the first damager tolerant cover sheet (10*a*) and the second damage tolerant cover sheet (10*b*) are embedded in the first cured resin.

8. A pre-manufactured spar cap according to item 6 or 7, wherein the first cured resin is vinyl ester resin, epoxy ester resin or polyurethane resin.

9. A pre-manufactured spar cap according to any of items 6-8, wherein the first and second surfaces of the spar cap structure are the two largest surfaces of the spar cap structure, and the second surface of the spar cap structure is opposite the first surface of the spar cap structure.

10. A pre-manufactured spar cap according to any of items 6-9, wherein the spar cap structure has a length, a width and a height, wherein the length is longer than the width and the width is longer than the height and wherein the stacked rows of fibre-reinforced composite elements includes a first plurality of fibre-reinforced composite elements arranged adjacent to each other in a first row and a second plurality of fibre-reinforced composite elements arranged adjacent to each other in a second row on top of the first row, wherein the first and second row of fibre-reinforced elements are separated by a first interlayer.

11. A pre-manufactured spar cap according to any of items 6-10, wherein the fibre-reinforced composite elements are longitudinally extending pultruded carbon planks with a substantially square cross-section.

12. A wind turbine blade comprising
    an outer shell comprising a first plurality of shell fibre layers
    a spar cap structure comprising a plurality of fibre-reinforced composite elements arranged in stacked rows and separated by interlayers,
    a first damage tolerant cover sheet (10*a*) according to any of items 1-5 arranged at a first interface between the first plurality of shell fibre layers (51) and a first surface of the spar cap structure (48), such that the second outer surface of the first damage tolerant cover sheet (12*a*) is in contact with the first surface of the spar cap structure (48) and such that the first outer surface of the first damage tolerant cover sheet (11*a*) is in contact with the first plurality of shell fibre layers (51), and
wherein the spar cap structure and the first damage tolerant cover sheet are embedded in a first cured resin to form a premanufactured spar cap and wherein the first plurality of shell fibre layers and the premanufactured spar cap are embedded in a second cured resin, different from the first cured resin; or;
wherein the spar cap structure is embedded in the first cured resin to form a premanufactured spar cap and wherein the first plurality of shell fibre layers, the first damage tolerant cover sheet and the premanufactured spar cap are embedded in the second cured resin, different from the first cured resin.

13. A wind turbine blade according to item 12, further comprising
    a second plurality of shell fibre layers
    a second damage tolerant cover sheet according to any of items 1-5 arranged at a second interface between the second plurality of shell fibre layers (52) and a second surface of the spar cap structure (49), such that the second outer surface of the second damage tolerant cover sheet (12*b*) is in contact with the second surface of the spar cap structure (49) and such that the first outer surface of the second damage tolerant cover sheet (11*b*) is in contact with the second plurality of shell fibre layers (52), and
wherein the spar cap structure, the first damage tolerant cover sheet and the second damage tolerant cover sheet are embedded in the first cured resin to form a premanufactured spar cap and wherein the first plurality of shell fibre layers, the second plurality of shell fibre layers and the premanufactured spar cap are embedded in the second cured resin; or;
wherein the spar cap structure is embedded in a first cured resin to form a premanufactured spar cap and wherein the first and second plurality of shell fibre layers, the first damage tolerant cover sheet, the second damage tolerant cover sheet and the premanufactured spar cap are embedded in a second cured resin, different from the first cured resin.

14. A wind turbine blade according to any of items 12 or 13, wherein the first cured resin is vinyl ester resin, epoxy ester resin or polyurethane resin and wherein the second cured resin is polyester resin.

15. A wind turbine blade according to any of items 12-14, wherein the first and second surfaces of the spar cap structure are the two largest surfaces of the spar cap structure and the second surface of the spar cap structure is opposite the first surface of the spar cap structure.

16. A wind turbine blade according to any of items 12-15, wherein the spar cap structure has a length, a width and a height, wherein the length is longer than the width and the width is longer than the height and wherein the stacked rows of fibre-reinforced composite elements includes a first plurality of fibre-reinforced composite elements arranged adjacent to each other in a first row and a second plurality of fibre-reinforced composite elements arranged adjacent to each other in a second row on top of the first row, wherein the first and second row of fibre-reinforced elements are separated by a first interlayer.

17. A wind turbine blade according to any of items 12-16, wherein the fibre-reinforced composite elements are longitudinally extending pultruded carbon planks with a substantially square cross-section.

18. Method of providing a pre-manufactured spar cap for a wind turbine blade, the method comprising the steps of:
providing a spar cap mould comprising a spar cap moulding surface,
arranging a first damage tolerant cover sheet (10a) according to any of items 1-5 on the spar cap moulding surface such that the first outer surface of the first damage tolerant cover sheet (11a) is in contact with the spar cap moulding surface,
arranging a spar cap structure comprising a plurality of fibre-reinforced composite elements in stacked rows, separated by interlayers, on the first damage tolerant cover sheet, such that the second outer surface of the first damage tolerant cover sheet (12a) is in contact with the first surface of the spar cap structure (48),
infusing the spar cap structure and the first damage tolerant cover sheet (10a) with a first resin,
allowing the first resin to cure to form a pre-manufactured spar cap.

19. Method according to item 18, wherein the method further comprises arranging a second damage tolerant cover sheet (10b) on the spar cap structure such that the second outer surface of the damage tolerant cover sheet (12b) is in contact with the second surface of the spar cap structure and wherein the step of infusing the spar cap structure and the first damage tolerant cover sheet (10a) with a first resin also includes infusing the second damage tolerant cover sheet (10b) with the first resin.

20. Method according to item 18 or 19, wherein the first resin is vinyl ester resin, epoxy ester resin or polyurethane resin.

21. Method according to any of items 18-20, wherein the first and second surfaces of the spar cap structure are the two largest surfaces of the spar cap structure and the second surface of the spar cap structure is opposite the first surface of the spar cap structure.

22. Method according to any of items 18-21, wherein arranging the spar cap structure comprising a plurality of fibre-reinforced composite elements in stacked rows, includes arranging a first plurality of fibre-reinforced composite elements adjacent to each other in a first row and arranged in second plurality of fibre-reinforced composite elements adjacent to each other in a second row on top of the first row, wherein the first and second row of fibre-reinforced elements are separated by a first interlayer.

23. Method according to any of items 18-22, wherein the spar cap structure has a length, a width and a height, wherein the length is longer than the width and the width is longer than the height and wherein the fibre-reinforced composite elements are longitudinally extending pultruded carbon planks with a substantially square cross-section.

24. Method of manufacturing a blade shell member for a wind turbine blade, the method comprising the steps of:
providing a blade mould (70) for the blade shell member, the blade mould (70) comprising a moulding surface (71) and a moulding cavity (72);
arranging a first plurality of shell fibre layers on the moulding surface of the blade mould
arranging a first damage tolerant cover sheet according to any of items 1-5 on top of the first plurality of shell fibre layers, such that a first outer surface of the first damage tolerant cover sheet is in contact with the first plurality of shell fibre layers;
providing a premanufactured spar cap comprising a spar cap structure comprising a plurality of fibre-reinforced composite elements arranged in stacked rows and separated by interlayers, wherein the spar cap structure and interlayers are embedded in a first cured resin;
arranging the premanufactured spar cap on top of the first damage tolerant cover sheet, such that a first surface of the spar cap structure is in contact with the second outer surface of the first damage tolerant cover sheet;
arranging a second damage tolerant cover sheet according to any of items 1-5 on top of the premanufactured spar cap, such that a second outer surface of the second damage tolerant cover sheet is in contact with a second surface of spar cap structure,
arranging a second plurality of shell fibre layers on the second damage tolerant cover sheet, such that the second plurality of shell fibre layers is in contact with a first outer surface of the second damage tolerant cover sheet;
infusing the blade moulding cavity with a second resin;
allowing the second resin to cure to form the blade shell member.

25. Method according to item 24, wherein the premanufactured spar cap is provided by:
providing a spar cap mould comprising a moulding surface
arranging a spar cap structure comprising a plurality of fibre-reinforced composite elements in stacked rows, separated by interlayers on the moulding surface of the spar cap mould,
infusing the spar cap structure with a first resin,
allowing the first resin to cure to form the pre-manufactured spar cap.

26. Method of manufacturing a blade shell member for a wind turbine blade, the method comprising the steps of:
providing a blade mould (70) for the blade shell member, the blade mould (70) comprising a moulding surface (71) and a moulding cavity (72);
arranging a first plurality of shell fibre layers on the moulding surface of the blade mould
providing a premanufactured spar cap according to any of items 6-11 arranging the premanufactured spar cap on top of the first plurality of shell fibre layers such that the first outer surface of the damage tolerant cover layer is in contact with the first plurality of shell fibre layers, arranging a second plurality of shell fibre layers on the premanufactured spar cap, such that the second plurality of shell fibre layers is in contact with a first outer surface of the second damage tolerant cover sheet;

infusing the blade moulding cavity with a second resin;

allowing the second resin to cure to form the blade shell member.

27. Method according to any of items 24-26, wherein the first resin is vinyl ester rein, epoxy ester resin or polyurethane resin and the second resin is polyester resin 28. Method according to any of items 24-27, wherein the blade shell member is a pressure side shell half or a suction side shell half of a wind turbine blade.

29. Method of manufacturing a wind turbine blade (1000), the method comprising providing a pressure side shell half and a suction side shell half in accordance with items 24-28 over substantially the entire length of the wind turbine blade and subsequently closing and joining the shell halves for obtaining a closed shell.

LIST OF REFERENCE NUMERALS

10 damage tolerant cover sheet
10*a* first damage tolerant cover sheet
10*b* second damage tolerant cover sheet
11 first outer surface of the damage tolerant cover sheet
11*a* first outer surface of the first damage tolerant cover sheet
11*b* first outer surface of the second damage tolerant cover sheet
12 second outer surface of the damage tolerant cover sheet
12*a* second outer surface of the first damage tolerant cover sheet
12*b* second outer surface of the second damage tolerant cover sheet
21 first damage tolerant fibre layer
21*a* first damage tolerant fibre layer of first damage tolerant cover sheet
21*b* first damage tolerant fibre layer of second damage tolerant cover sheet
22 second damage tolerant fibre layer
22*a* second damage tolerant fibre layer of first damage tolerant cover sheet
22*b* second damage tolerant fibre layer of second damage tolerant cover sheet
31 attachment areas
32 distance between attachment areas
33 attachment direction
40 Pre-manufactured spar cap
41 spar cap structure
42 fibre reinforced composite elements
43 rows of fibre reinforced composite elements
44 interlayers
48 first surface of spar cap structure
49 second surface of spar cap structure
51 first plurality of shell fibre layers
52 second plurality of shell fibre layers
53 further blade components, such as core elements and/or shear webs
70 blade mould
71 moulding surface
72 moulding cavity
200 wind turbine
400 tower
600 nacelle
800 hub
1000 blade
1400 blade tip
1600 blade root
1800 leading edge
2000 trailing edge
2200 pitch axis
2400 pressure side
2600 suction side
3000 root region
3200 transition region
3400 airfoil region
3800 chord line
4000 shoulder/position of maximum chord

The invention claimed is:

1. A pre-manufactured spar cap (40) for a wind turbine blade comprising
   a spar cap structure (41) comprising a plurality of fibre-reinforced composite elements (42) arranged in stacked rows (43) and separated by interlayers (44); and
   a first damage tolerant cover sheet (10*a*) comprising:
      a first damage tolerant fibre layer (21*a*) forming part of a first outer surface of the first damage tolerant cover sheet (11*a*), wherein the first damage tolerant fibre layer (21*a*) comprises a first plurality of fibres being unidirectionally arranged along a first fibre direction; and
      a second damage tolerant fibre layer (22*a*) forming part of a second outer surface of the first damage tolerant cover sheet (12*a*), the second outer surface of the first damage tolerant cover sheet being opposite to the first outer surface of the damage tolerant cover sheet, wherein the second damage tolerant fibre layer (22*a*) comprises a second plurality of fibres being randomly arranged with respect to one another,
      wherein the first damage tolerant fibre layer (21*a*) and the second damage tolerant fibre layer (22*a*) are attached to each other in attachment areas (31) by a first plurality of stitching rows and/or by a first binding agent arranged between the first and second damage tolerant fibre layers in the attachment areas (31), and wherein the attachments areas (31) are separated from each other by a distance (32) between 1-5 cm,
   wherein the first damage tolerant cover sheet (10*a*) is arranged such that the second outer surface of the first damage tolerant cover sheet (12*a*) is in contact with a first surface of the spar cap structure (48), and
   wherein the spar cap structure (48) and the first damager tolerant cover sheet (10*a*) are embedded in a first cured resin.

2. The pre-manufactured spar cap according to claim 1, wherein the pre-manufactured spar cap further comprises a second damage tolerant cover sheet (10*b*) comprising:
   a first damage tolerant fibre layer (21*b*) forming part of a first outer surface of the second damage tolerant cover sheet (11*b*), wherein the first damage tolerant fibre layer (21*b*) of the second damage tolerant cover sheet (10*b*) comprises a third plurality of fibres being unidirectionally arranged along a second fibre direction; and
   a second damage tolerant fibre layer (22*b*) forming part of a second outer surface of the second damage tolerant cover sheet (12*b*), the second outer surface of the second damage tolerant cover sheet being opposite to the first outer surface of the damage tolerant cover sheet, wherein the second damage tolerant fibre layer (22b) of the second damage tolerant covers heet (10b) comprises a fourth plurality of fibres being randomly arranged with respect to one another, wherein the first damage tolerant fibre layer (21b) and the second damage tolerant fibre layer (22b) are attached to each other in attachment areas (31) by a first plurality of stitching rows and/or by a first binding agent arranged between the first and second damage tolerant fibre layer in the attachment areas (31), and wherein the attachments areas (31) are separated from each other by a distance (32) between 1-5 cm, wherein the second damage tolerant cover sheet (10b) is arranged such that the second outer surface of the second damage tolerant cover sheet (12b) is in contact with the second surface of the spar cap structure (49), and wherein the spar cap structure (41), the first damage tolerant cover sheet (10a) and the second damage tolerant cover sheet (10b) are embedded in the first cured resin.

3. The pre-manufactured spar cap according to claim 1, wherein an arrangement of the first plurality of fibres (27) is maintained relative to each other by a second plurality of stitching rows and/or by a second binding agent, and wherein an arrangement of the second plurality of fibres are maintained relative to each other by a third binding agent.

4. The pre-manufactured spar cap according to claim 1, wherein the first damage tolerant fibre layer is a unidirectional or biaxial glass fibre layer and the second fibre layer is a chopped strand mat (CSM) or a continuous filament mat (CFM) comprising glass fibres and/or wherein the first plurality of attachment areas are parallel to each other and arranged along a first attachment direction and/or wherein the area weight of the damage tolerant cover sheet is between 400 gsm and 1000 gsm.

5. The pre-manufactured spar cap according to claim 1, wherein the first cured resin is vinyl ester resin, epoxy ester resin or polyurethane resin and/or wherein the first and second surfaces of the spar cap structure are the two largest surfaces of the spar cap structure, and the second surface of the spar cap structure is opposite the first surface of the spar cap structure and/or wherein the spar cap structure has a length, a width and a height, wherein the length is longer than the width and the width is longer than the height and wherein the stacked rows of fibre-reinforced composite elements includes a first plurality of fibre-reinforced composite elements arranged adjacent to each other in a first row and a second plurality of fibre-reinforced composite elements arranged adjacent to each other in a second row on top of the first row, wherein the first and second row of fibre-reinforced elements are separated by a first interlayer and/or wherein the fibre-reinforced composite elements are longitudinally extending pultruded carbon planks with a square cross-section.

6. A wind turbine blade, comprising:
an outer shell comprising a first plurality of shell fibre layers (51);
a spar cap structure (41) comprising a plurality of fibre-reinforced composite elements (42) arranged in stacked rows (43) and separated by interlayers (44); and
a first damage tolerant cover sheet (10a) comprising:
a first damage tolerant fibre layer (21a) forming part of a first outer surface of the second damage tolerant cover sheet (11a), wherein the first damage tolerant fibre layer (21a) comprises a first plurality of fibres being unidirectionally arranged along a first fibre direction; and
a second damage tolerant fibre layer (22a) forming part of a second outer surface of the second damage tolerant cover sheet (12a), the second outer surface of the second damage tolerant cover sheet being opposite to the first outer surface of the damage tolerant cover sheet, wherein the second damage tolerant fibre layer (22a) comprises a second plurality of fibres being randomly arranged with respect to one another, wherein the first damage tolerant fibre layer (21a) and the second damage tolerant fibre layer (22a) are attached to each other in attachment areas (31) by a first plurality of stitching rows and/or by a first binding agent arranged between the first and second damage tolerant fibre layer in the attachment areas (31), and wherein the attachments areas (31) are separated from each other by a distance (32) between 1-5 cm, wherein the first damage tolerant cover sheet (10a) is arranged at a first interface between the first plurality of shell fibre layers (51) and a first surface of the spar cap structure (48), such that the second outer surface of the first damage tolerant cover sheet (12a) is in contact with the first surface of the spar cap structure (48) and such that the first outer surface of the first damage tolerant cover sheet (11a) is in contact with the first plurality of shell fibre layers (51), and wherein the spar cap structure (41) and the first damage tolerant cover sheet (10a) are embedded in a first cured resin to form a premanufactured spar cap (40) and wherein the first plurality of shell fibre layers (51) and the premanufactured spar cap (40) are embedded in a second cured resin, the second cured resin being different from the first cured resin, or wherein the spar cap structure (41) is embedded in the first cured resin to form a premanufactured spar cap (40), and wherein the first plurality of shell fibre layers (51), the first damage tolerant cover sheet (10a) and the premanufactured spar cap (40) are embedded in the second cured resin, the second cured resin being different from the first cured resin.

7. The wind turbine blade according to claim 6, further comprising:
a second plurality of shell fibre layers (52); and
a second damage tolerant cover sheet (10b) comprising:
a first damage tolerant fibre layer (21b) forming part of a first outer surface of the second damage tolerant cover sheet (11b), wherein the first damage tolerant fibre layer (21b) of the second damage tolerant cover sheet (10b) comprises a third plurality of fibres being unidirectionally arranged along a second fibre direction; and
a second damage tolerant fibre layer (22b) forming part of a second outer surface of the second damage tolerant cover sheet (12b), the second outer surface of the second damage tolerant cover sheet being opposite to the first outer surface of the damage tolerant cover sheet, wherein the second damage tolerant fibre layer (22b) of the second damage tolerant cover sheet (10b) comprises a fourth plurality of fibres being randomly arranged with respect to one another, wherein the first damage tolerant fibre layer (21b) and the second damage tolerant fibre layer (22b) are attached to each other in attachment areas (31) by a first plurality of stitching rows and/or by a first binding agent arranged between the first and second damage tolerant fibre layer in the attachment areas (31), and wherein the attachments areas (31) are separated from each other by a distance (32) between 1-5 cm, wherein the second damage tolerant cover sheet (10b) is arranged at a second interface between the second plurality of shell fibre layers (52) and a second surface of the spar cap structure (49), such that the second outer surface of the second damage tolerant cover sheet (12b) is in contact with the second surface of the spar cap structure (49) and such that the first outer surface of the second damage tolerant cover sheet (11b) is in contact with the second plurality of shell fibre layers (52), and wherein the spar cap structure (41), the first damage tolerant cover sheet (10a) and the second damage tolerant cover sheet (10b) are embedded in the first cured resin to form a premanufactured spar cap (40), and wherein the first plurality of shell fibre layers (51), the second plurality of shell fibre layers (52) and the premanufactured spar cap (40) are embedded in the second cured resin, or wherein the spar cap structure (41) is embedded in the first cured resin to form a premanufactured spar cap (40), and wherein the first and second plurality of shell fibre layers (51, 52), the first damage tolerant cover sheet (10a), the second damage tolerant cover sheet (10b) and the premanufactured spar cap (40) are embedded in a second cured resin, the second cured resin being different from the first cured resin.

8. The wind turbine blade according to claim 6, wherein the first cured resin is vinyl ester resin, epoxy ester resin or polyurethane resin, and wherein the second cured resin is polyester resin.

9. A damage tolerant cover sheet (10), comprising:
a first damage tolerant fibre layer (21) forming part of a first outer surface of the damage tolerant cover sheet (11), wherein the first damage tolerant fibre layer (21) comprises a first plurality of fibres being unidirectionally arranged along a first fibre direction;
a second damage tolerant fibre layer (22) forming part of a second outer surface of the damage tolerant cover sheet (12), the second outer surface of the damage tolerant cover sheet being opposite to the first outer surface of the damage tolerant cover she et, wherein the second damage tolerant fibre layer (22) comprises a second plurality of fibres being randomly arranged with respect to one another,
wherein the first damage tolerant fibre layer (21) and the second damage tolerant fibre layer (22) are attached to each other in attachment areas (31) by a first plurality of stitching rows and/or by a first binding agent arranged between the first and second damage tolerant fibre layer in the attachment areas (31), and
wherein the attachments areas (31) are separated from each other by a distance (32) between 1-5 cm.

10. A method of providing a pre-manufactured spar cap (40) for a wind turbine blade, the method comprising the steps of:
providing a spar cap mould comprising a spar cap moulding surface;
arranging a first damage tolerant cover sheet (10a) on the spar cap moulding surface such that the first outer surface of the first damage tolerant cover sheet (11a) is in contact with the spar cap moulding surface, wherein the first damage tolerant cover sheet (10a) comprises the damage tolerant cover sheet (10) according to claim 9;
arranging a spar cap structure (41) comprising a plurality of fibre-reinforced composite elements (42) in stacked rows (43), separated by interlayers (44), on the first damage tolerant cover sheet (10a), such that the second outer surface of the first damage tolerant cover sheet (12a) is in contact with the first surface of the spar cap structure (48);
infusing the spar cap structure (41) and the first damage tolerant cover sheet (10a) with a first resin; and
allowing the first resin to cure to form the pre-manufactured spar cap (40).

11. The method according to claim 10, wherein the method further comprises arranging a second damage tolerant cover sheet (10b) on the spar cap structure (41), wherein the second damage tolerant cover sheet (10b) comprises:
a third damage tolerant fibre layer forming part of a first outer surface of the second damage tolerant cover sheet (10b); and
a fourth damage tolerant fibre layer forming part of a second outer surface of the second damage tolerant cover sheet (10b), the second outer surface of the second damage tolerant cover sheet being opposite to the first outer surface of the second damage tolerant cover sheet,
wherein the third damage tolerant fibre layer and the fourth damage tolerant fibre layer are attached to each other in attachment areas by a plurality of stitching rows and/or by a binding agent arranged between the third and fourth damage tolerant fibre layers in the attachment areas,
wherein the attachments areas are separated from each other by a distance between 1-5 cm, and
wherein the second outer surface of the damage tolerant cover sheet (12b) is in contact with the second surface of the spar cap structure (49), and
wherein the step of infusing the spar cap structure (41) and the first damage tolerant cover sheet (10a) with a first resin also includes infusing the second damage tolerant cover sheet (10b) with the first resin.

12. The method according to claim 10, wherein the arranging of the spar cap structure (41), includes arranging a first plurality of fibre-reinforced composite elements (42) adjacent to each other in a first row (43a) and arranged in second plurality of fibre-reinforced composite elements (42) adjacent to each other in a second row (43b) on top of the first row, wherein the first and second rows (43a, 43b) of fibre-reinforced elements (42) are separated by a first interlayer (44a) and/or wherein the spar cap structure (41) has a length, a width and a height, wherein the length is longer than the width and the width is longer than the height, and wherein the fibre-reinforced composite elements are longitudinally extending pultruded carbon planks with a square cross-section.

13. A method of manufacturing a wind turbine blade (1000), the method comprising providing a pressure side blade shell member and a suction side blade shell member over the entire length of the wind turbine blade and subsequently closing and joining the pressure side blade shell member and the suction side blade shell member to obtain a closed shell, wherein the providing of the pressure side blade shell member or the providing of the suction side blade shell member comprises the steps of:

providing a blade mould (70) for a blade shell member, the blade mould (70) comprising a moulding surface (71) and a moulding cavity (72);

arranging a first plurality of shell fibre layers (51) on the moulding surface (71) of the blade mould (70);

arranging a first damage tolerant cover sheet (10a) on top of the first plurality of shell fibre layers (51), such that a first outer surface of the first damage tolerant cover sheet (11a) is in contact with the first plurality of shell fibre layers (51), wherein the first damage tolerant cover sheet (10a) comprises the damage tolerant cover sheet (10) according to claim 9;

providing a premanufactured spar cap (40) comprising a spar cap structure (41) comprising a plurality of fibre-reinforced composite elements (42) arranged in stacked rows (43) and separated by interlayers (44), wherein the spar cap structure (41) and interlayers (44) are embedded in a first cured resin;

arranging the premanufactured spar cap (40) on top of the first damage tolerant cover sheet (10a), such that a first surface of the spar cap structure (48) is in contact with the second outer surface of the first damage tolerant cover sheet (12a);

arranging a second damage tolerant cover sheet (10b) 9 on top of the premanufactured spar cap (40), such that a second outer surface of the second damage tolerant cover sheet (12b) is in contact with a second surface of spar cap structure (49), wherein the second damage tolerant cover sheet (10b) comprises the damage tolerant cover sheet (10) according to claim 9;

arranging a second plurality of shell fibre layers (52) on the second damage tolerant cover sheet (10b), such that the second plurality of shell fibre layers (52) is in contact with a first outer surface of the second damage tolerant cover sheet (11b);

infusing the blade moulding cavity (72) with a second resin; and allowing the second resin to cure to form the blade shell member.

14. A method of manufacturing a wind turbine blade (1000), the method comprising providing a pressure side blade shell member and a suction side blade shell member over the entire length of the wind turbine blade and subsequently closing and joining the pressure side blade shell member and the suction side blade shell member for obtaining a closed shell, wherein providing the pressure side blade shell member or providing the suction side blade shell member comprises the steps of:

providing a blade mould (70) for the blade shell member, the blade mould (70) comprising a moulding surface (71) and a moulding cavity (72);

arranging a first plurality of shell fibre layers (51) on the moulding surface (71) of the blade mould (70);

providing the premanufactured spar cap (40) according to claim 1;

arranging the premanufactured spar cap (40) on top of the first plurality of shell fibre layers (51) such that the first outer surface of the first damage tolerant cover layer (11a) is in contact with the first plurality of shell fibre layers (51);

arranging a second plurality of shell fibre layers (52) on the premanufactured spar cap (40), such that the second plurality of shell fibre layers (52) is in contact with a first outer surface of the second damage tolerant cover sheet (11b);

infusing the blade moulding cavity (72) with a second resin; and allowing the second resin to cure to form the blade shell member.

15. The method according to claim 13, wherein the first resin is vinyl ester resin, epoxy ester resin or polyurethane resin, and the second resin is polyesterresin.

* * * * *